United States Patent
Gupta

(10) Patent No.: US 11,353,964 B2
(45) Date of Patent: Jun. 7, 2022

(54) WEARABLE DEVICE FOR DISPLAYING CON LENT, AND METHOD THEREOF

(71) Applicant: Samsung Electronics Co., Ltd., Suwon-si (KR)

(72) Inventor: Vinamra Gupta, Jodhpur (IN)

(73) Assignee: Samsung Electronics Co., Ltd., Suwon-si (KR)

(*) Notice: Subject to any disclaimer, the term of this patent is extended or adjusted under 35 U.S.C. 154(b) by 131 days.

(21) Appl. No.: 16/684,019

(22) Filed: Nov. 14, 2019

(65) Prior Publication Data
US 2020/0150782 A1   May 14, 2020

(30) Foreign Application Priority Data

Nov. 14, 2018 (IN) .............................. 201841042830
Oct. 24, 2019 (KR) ........................ 10-2019-0133260

(51) Int. Cl.
*G06F 3/023* (2006.01)
*G06F 3/01* (2006.01)

(52) U.S. Cl.
CPC ............ *G06F 3/0238* (2013.01); *G06F 3/012* (2013.01)

(58) Field of Classification Search
None
See application file for complete search history.

(56) References Cited

U.S. PATENT DOCUMENTS

| | | | |
|---|---|---|---|
| 8,502,780 B1 * | 8/2013 | Park ...................... | G06F 3/0227 345/165 |
| 9,697,383 B2 | 7/2017 | Dow et al. | |
| 9,947,012 B2 | 4/2018 | Smith et al. | |
| 10,021,232 B2 | 7/2018 | Yoon et al. | |
| 2006/0117173 A1 | 6/2006 | Deblock et al. | |
| 2008/0148186 A1 | 6/2008 | Krishnamurthy | |
| 2015/0128251 A1 | 5/2015 | Yoon et al. | |
| 2015/0261968 A1 | 9/2015 | Polyachenko | |

(Continued)

FOREIGN PATENT DOCUMENTS

WO   2014/081076 A1   5/2014

OTHER PUBLICATIONS

International Search Report dated Feb. 26, 2020, issued in International Patent Application No. PCT/KR2019/015537.

(Continued)

*Primary Examiner* — Robin J Mishler
(74) *Attorney, Agent, or Firm* — Jefferson IP Law, LLP

(57) ABSTRACT

A method by which a wearable device displays content and a wearable device therefor are provided. The method includes authorizing a user wearing the wearable device, identifying a first key layout of an input device connected to an electronic device used by the authorized user, generating mapping information in which at least one key in the first key layout is mapped to a different key, displaying, on a display of the wearable device, a second key layout in which the first key layout is mapped according to the mapping information, determining second content as content input by the authorized user, based on the second key layout and an input of the authorized user with respect to the input device, and displaying the second content on the display of the wearable device. The second content and first content may be mutually mapped to each other according to the mapping information.

13 Claims, 26 Drawing Sheets

(56) References Cited

U.S. PATENT DOCUMENTS

| | | |
|---|---|---|
| 2015/0309724 A1 | 10/2015 | Wu |
| 2016/0063228 A1 | 3/2016 | Fang et al. |
| 2016/0314468 A1* | 10/2016 | Smith .................. G07F 7/1041 |
| 2018/0091306 A1 | 3/2018 | Antonopoulos et al. |

OTHER PUBLICATIONS

Indian Office Action dated Jan. 19, 2021, issued in Indian Patent Application No. 201841042830.

* cited by examiner

WEARABLE DEVICE FOR DISPLAYING CONTENT, AND METHOD THEREOF

CROSS-REFERENCE TO RELATED APPLICATION(S)

This application is based on and claims priority under 35 U.S.C. § 119(a) of an Indian patent application number 201841042830, filed on Nov. 14, 2018, in the Indian Patent Office and of a Korean patent application number 10-2019-0133260, filed on Oct. 24, 2019, in the Korean Intellectual Property Office, the disclosures of each of which is incorporated by reference herein in its entirety.

BACKGROUND

1. Field

The disclosure relates to a wearable device for displaying content, and a method thereof. More particularly, the disclosure relates to a device and method of converting content for security and then displaying the content.

2. Description of Related Art

When a user inputs content such as password onto an electronic device, the content may be exposed to another person. For example, the other person around the user may look content displayed on the electronic device and thus may identify the content input by the user. Also, the other person may look at which keys are selected on an input device by the user and thus may identify content input by the user. As such, a nearby person obtaining information by looking at content input by a user is called "shoulder surfing".

To prevent the shoulder surfing, a method, performed by a wearable device, of encrypting user-input content and transmitting the encrypted content to an electronic device may be used. However, the method of encrypting content may be exposed to an attack over a network. For example, information used in encrypting content may be exposed to hacking with respect to a network to which a wearable device and an electronic device are connected or attacks including spoofing, snooping, sniffing, or the like that illegitimately gain the information.

Therefore, there is a demand for a method by which a user can input content to an electronic device in a manner secure against shoulder surfing or an attack over a network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wearable device for displaying mapping information in which at least one key in a first key layout of an input device is mapped to a different key or a second key layout converted from the first key layout according to the mapping information, and a method thereof.

Another aspect of the disclosure is to provide a wearable device for converting first content input by a user to second content, according to the mapping information, and performing an operation associated with the second content, and a method thereof.

Another aspect of the disclosure is to provide a method by which an electronic device displays hidden content of the electronic device to a user via a wearable device.

Additional aspects will be set forth in part in the description which follows and, in part, will be apparent from the description, or may be learned by practice of the presented embodiments of the disclosure.

In accordance with an aspect of the disclosure, a method, performed by a wearable device, of displaying content is provided. The method includes authorizing a user wearing the wearable device, identifying a first key layout of an input device connected to an electronic device used by the authorized user, generating mapping information in which at least one key in the first key layout is mapped to a different key, displaying, on a display of the wearable device, a second key layout in which the first key layout is mapped according to the mapping information, determining second content as content input by the authorized user, based on the second key layout and an input of the authorized user with respect to the input device, and displaying the second content on the display of the wearable device. The second content and first content may be mutually mapped to each other according to the mapping information, the first content being determined based on the first key layout and the input of the authorized user with respect to the input device.

The determining of the second content as the content input by the authorized user may include obtaining information about a key selected from the input device by the authorized user, determining a key mapped to the selected key, according to the mapping information, and determining the mapped key as the content input by the authorized user.

The method may further include transmitting the mapping information or the second content to the electronic device, the mapping information may be used when the first content is converted to the second content in the electronic device, and the second content may be used, as the content input the authorized user, in the electronic device.

The method may further include generating additional mapping information in which at least one key in the first key layout is mapped to a different key; and transmitting the additional mapping information to the electronic device, and the additional mapping information may be used when the first content is converted to third content before the third content is displayed on the display of the electronic device.

The method may further include receiving information about hidden content from the electronic device, and displaying the hidden content on the display of the wearable device, based on determining that the user wearing the wearable device is the authorized user, and the hidden content may indicate content that is not displayed on the display of the electronic device, the content being from among content stored in the electronic device or content executed in the electronic device.

The receiving of the information about the hidden content from the electronic device may include receiving, from the electronic device, a confirmation request requesting whether the user wearing the wearable device has authority to access the hidden content, transmitting a response message including at least one of positive response information or user authorization information about the authorized user to the electronic device, based on determining that the user wearing the wearable device is the authorized user, and receiving information about the hidden content from the electronic device, in response to the response message.

In accordance with an aspect of the disclosure, a method of performing, by an electronic device, an operation associated with content is provided. The method includes receiving, from a wearable device, mapping information in which at least one key in a first key layout of an input device connected to the electronic device is mapped to a different key, obtaining first content that is input from a user by using the input device, converting the first content to second content, according to the mapping information, and performing an operation associated with the second content. The operation associated with the second content may include at least one of an operation of storing the second content, an operation of transmitting the second content to an external device, an operation of authorizing a secure session by using the second content, or an operation of performing a preset process corresponding to the second content.

The first content may be obtained based on the first key layout and an input of the user with respect to the input device, and the method may further include displaying the first content on a display of the electronic device.

The method may further include receiving, from the wearable device, additional mapping information in which at least one key in the first key layout is mapped to a different key, converting the first content to third content, according to the additional mapping information, and displaying the third content on a display of the electronic device.

The method may further include determining whether a user wearing the wearable device has authority to access hidden content of the electronic device; transmitting the hidden content to the wearable device, based on a result of the determining, and performing an operation associated with the hidden content, in response to a user input of selecting the hidden content. The hidden content may indicate content that is not displayed on the display of the electronic device, the content being from among content stored in the electronic device or content executed in the electronic device.

In accordance with an aspect of the disclosure, a wearable device for displaying content is provided. The wearable device includes a transceiver, a display, a memory storing a plurality of instructions, and at least one processor configured to execute the plurality of instructions to authorize a user wearing the wearable device, identify a first key layout of an input device connected to an electronic device used by the authorized user, generate mapping information in which at least one key in the first key layout is mapped to a different key, control the display to display a second key layout in which the first key layout is mapped according to the mapping information, determine second content as content input by the authorized user, based on the second key layout and an input of the authorized user with respect to the input device, and control the display to display the second content. The second content and first content may be mutually mapped to each other according to the mapping information, the first content being determined based on the first key layout and the input of the authorized user with respect to the input device.

In accordance with another aspect of the disclosure, an electronic device for performing an operation associated with content is provided. The electronic device includes a transceiver, a display, a memory storing a plurality of instructions, and at least one processor configured to execute the plurality of instructions to control the transceiver to receive, from a wearable device, mapping information in which at least one key in a first key layout of an input device connected to the electronic device is mapped to a different key, obtain first content that is input from a user by using the input device, convert the first content to second content, according to the mapping information, and perform an operation associated with the second content. The operation associated with the second content may include at least one of an operation of storing the second content, an operation of transmitting the second content to an external device, an operation of authorizing a secure session by using the second content, or an operation of performing a preset process corresponding to the second content.

In accordance with another aspect of the disclosure, a computer-readable recording medium stores one or more programs including instructions for causing a computer to authorize a user wearing a wearable device, identify a first key layout of an input device connected to an electronic device used by the authorized user, generate mapping information in which at least one key in the first key layout is mapped to a different key, display, on a display of the wearable device, a second key layout in which the first key layout is mapped according to the mapping information, determine second content as content input by the authorized user, based on the second key layout and an input of the authorized user with respect to the input device, and display the second content on the display of the wearable device. The second content and first content may be mutually mapped to each other according to the mapping information, the first content being determined based on the first key layout and the input of the authorized user with respect to the input device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
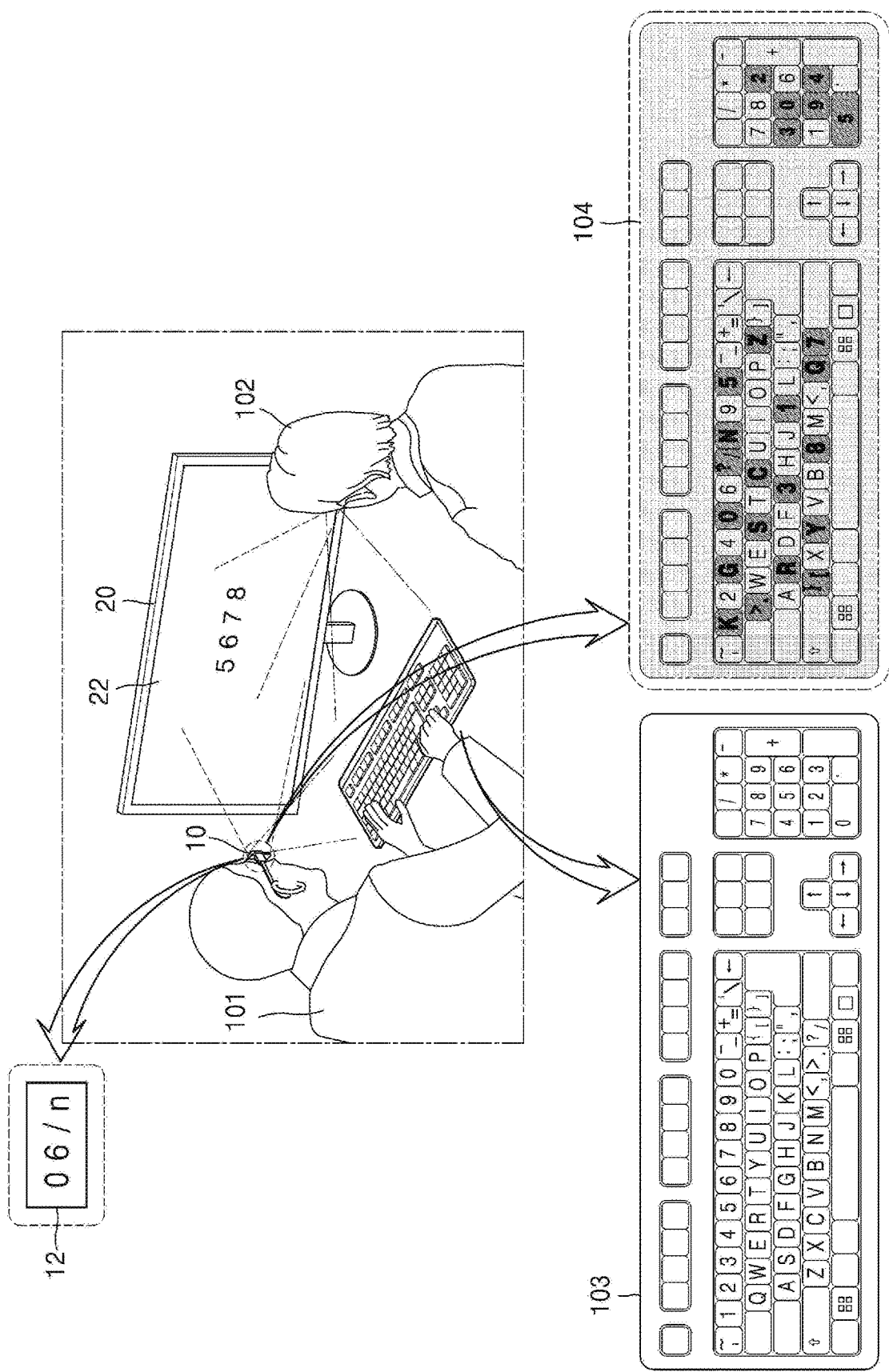
FIG. 1 is a diagram for describing a concept of a method by which a wearable device displays content, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Also, when a part "includes" or "comprises" a component, unless there is a particular description contrary thereto, the part can further include other components, not excluding the other components. In the following description, terms such as "unit" and "module" indicate a unit for processing at least one function or operation, wherein the unit and the module may be embodied as hardware or software or embodied by combining hardware and software.

The disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. In addition, portions irrelevant to the description of the disclosure will be omitted in the drawings for a clear description of the disclosure, and like reference numerals will denote like components throughout the specification.

Various operations, blocks, steps, and the like in flowcharts of the disclosure may be performed according to an illustrated order or an order different from the illustrated order. Also, at least some operations may be simultaneously performed. Also, in some embodiments of the disclosure, some of the operations, the blocks, or the steps may be skipped, added, or modified without departing from the spirit and scope of the disclosure.

Hereinafter, meanings of terms used in the disclosure are defined.

In the disclosure, the term 'wearable device' may refer to an electronic device to be worn by a user and display content. The wearable device may display augmented reality (AR) content or virtual reality content. For example, the wearable device may include AR glasses, a smartwatch, a smart lens, or the like. The wearable device may also be called "immersive device" because the wearable device provides a user with an experience related to virtual entities that do not physically exist. Also, although the wearable device includes a word "wearable", the wearable device may not be a device to be worn by a user. For example, the wearable device may be a portable device configured to display AR content or VR content. The portable device may include a smartphone, a smart tablet, or the like. However, for convenience of description, embodiments of the disclosure will now be described by using the term "wearable device".

In the disclosure, an electronic device refers to one of various electronic devices configured to display content by receiving an input from a user. For example, the electronic device may include a computer, a notebook computer, a mobile device, a smart device, a smartphone, a smart tablet, an automated teller machine (ATM) of a bank, or the like. However, the aforementioned examples are exemplary, and the electronic device may include various electronic devices capable of receiving a user input and displaying content.

In the disclosure, the term "input device" refers to a device that includes a plurality of selection items and receives a user input with respect to the plurality of selection items. The input device may be a physical hardware component. For example, the input device may be a keyboard, a mouse, a device such as a numeric keypad including physical buttons, or the like. Alternatively, the input device may refer to a software module. For example, the input device may be an input user interface displayed on a display of the electronic device. The input device may be combined with the electronic device, or may be separate from the electronic device and may be connected to the electronic device in a wired or wireless manner. In the disclosure, a selection item included in the input device is collectively called "key".

In the disclosure, the term "key layout" indicates an arrangement or an array of a plurality of keys included in the input device. For example, when the input device is a keyboard, the key layout may be QWERTY layout, Dvorak layout, 2-Set Korean layout, and the like.

In the disclosure, a key selected on the input device and a character or content corresponding to the selected key may be interchangeably used. That is, displaying of a key selected by a user may mean displaying of a character corresponding to the key that is selected on the input device by the user.

In the disclosure, the term "content" refers to one or more characters that are input in a manner that a user selects keys on the input device.

Hereinafter, embodiments of the disclosure will now be described with reference to the accompanying drawings.

FIG. 1 is a diagram for describing a concept of a method by which a wearable device 10 displays content, according to an embodiment of the disclosure.

Referring to FIG. 1, a user 101 inputs content to an electronic device 20 by using an input device 103. Also, the user 101 is wearing the wearable device 10. When the user 101 inputs content to the electronic device 20, the substance of the input content may be exposed to a nearby person 102 located near the user 101, or the nearby person 102 may identify the substance of the content input by the user 101 by looking at which keys are selected on the input device 103 by the user 101. When the content input by the user 101 is security-required content such as password or any other personal information, it may be necessary to prevent shoulder surfing so as to keep security.

According to an embodiment of the disclosure, the wearable device 10 worn by the user 101 may generate mapping information in which at least one key in a first key layout of the input device 103 is mapped to a different key. The wearable device 10 may display, on a display 12, a second key layout 104 mapped from the first key layout, according to the mapping information. The user 101 may input content by selecting a key of the input device 103, based on the second key layout 104 displayed on the wearable device 10. In this regard, a key selected from the input device 103 by the user 101 may be displayed on a display 22 of the electronic device 20, based on the first key layout. The wearable device 10 may map at least one key to a different key, the at least one key being in the first key layout of the input device 103, and may display the mapped second key layout 104, thereby preventing shoulder surfing by the nearby person 102.

For example, the wearable device 10 may map '5, 6, 7, 8' keys in the first key layout to 'o, 6, /, n' keys, respectively. According to the mapping, the second key layout 104 may be displayed on the wearable device 10 worn by the user 101. Selection of 'o, 6, /, n' keys, by the user 101, from the second key layout 104 displayed on the wearable device 10 corresponds to selection of '5, 6, 7, 8' keys from the actual input device 103. That is, the nearby person 102 can see that the user 101 selects '5, 6, 7, 8' keys from the actual input device 103 but the nearby person 102 cannot know that keys input by the user 101 are 'o, 6, /, n' keys. Also, '5, 6, 7, 8' that are content according to the keys selected from the input device 103 by the user 101 may be displayed on the display 22 of the electronic device 20, and 'o, 6, /, n' that are content according to the mapping to the wearable device 10 may not be displayed. Therefore, even when the nearby person 102 looks the display 22 of the electronic device 20, the nearby person 102 may not know 'o, 6, /, n' that are content input by the user 101.

Security content of a user may be exposed to an attack over network, other than shoulder surfing. For example, the security content may be exposed to snooping that is an attack to illegitimately obtain information over network.

According to an embodiment of the disclosure, the wearable device 10 uses a direct communication scheme with respect to the electronic device 20, such that the wearable device 10 can enhance security with respect to content without exposing mapping information about a key layout to an external server or a network. The wearable device 10 may not receive mapping information about a key layout from the external server or the network but may directly generate the mapping information and may transmit the mapping information to the electronic device 20. The electronic device 20 may convert, according to the received mapping information, first content (e.g., '5, 6, 7, 8') input by the user 101 via the input device 103 to second content (e.g., 'o, 6, /, n'). Also, the wearable device 10 may transmit, to the electronic device 20, the second content that is converted from the first content according to the mapping information. The electronic device 20 may identify the second content as a user input, instead of the first input inputted by the user 101 via the input device 103, and may perform an operation associated with the second content. As described above, the wearable device 10 may transmit, to the electronic device 20, the mapping information or the second content converted according to the mapping information, thereby preventing an attack over network such as snooping against content.

Figure 2:
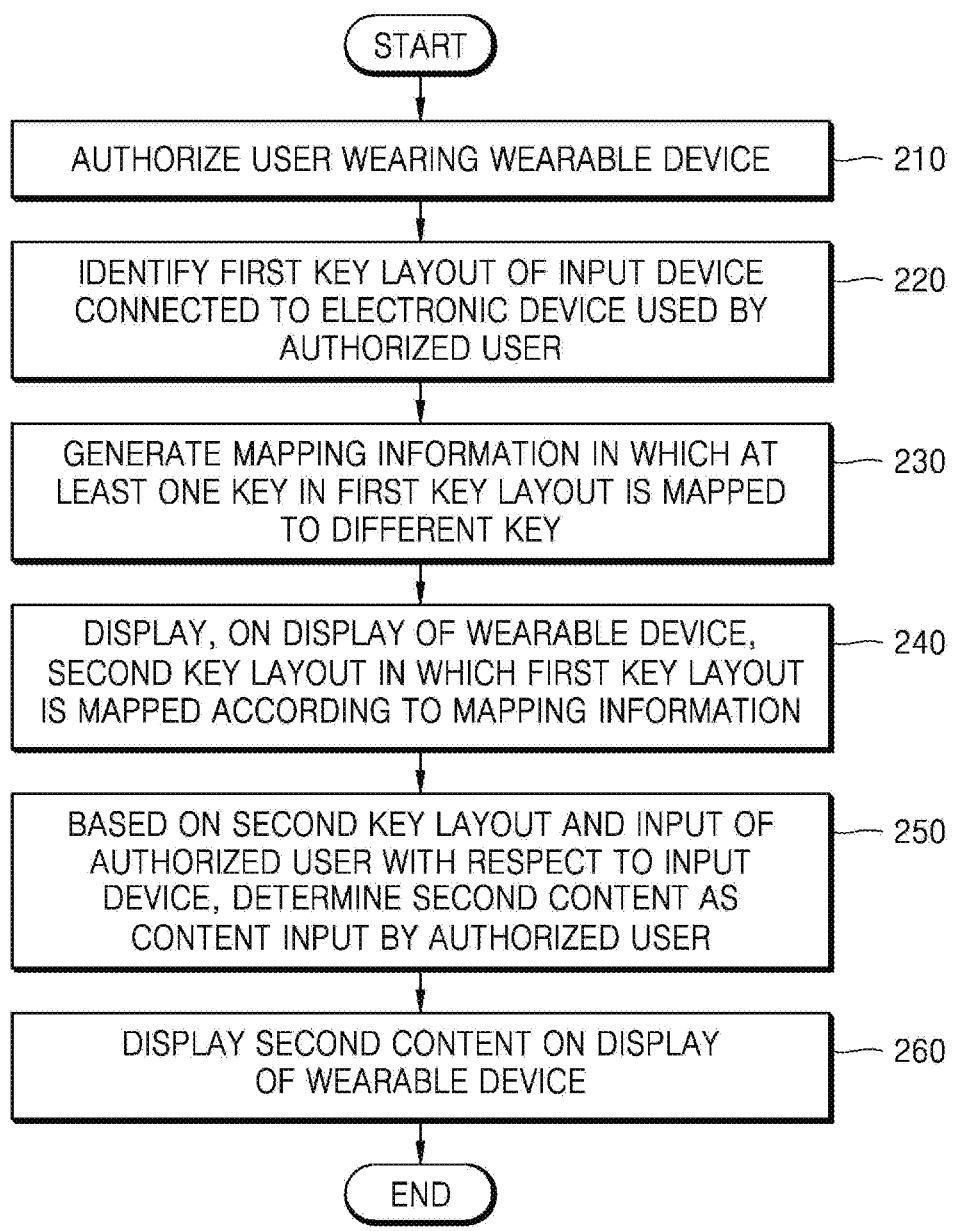
FIG. 2 is a flowchart for describing a method of displaying content, the method being performed by the wearable device, according to an embodiment of the disclosure.

FIG. 2 is a flowchart for describing a method of displaying content, the method being performed by the wearable device 10, according to an embodiment of the disclosure.

Referring to FIG. 2, in operation 210, the wearable device 10 according to an embodiment of the disclosure may authorize a user wearing the wearable device 10.

Though the wearable device 10 displays security information of a user on a display of the wearable device 10, anyone can wear the wearable device 10. Therefore, it is required to authorize whether a user wearing the wearable device 10 is a person who is authorized to access security information.

The wearable device 10 may authorize the user wearing the wearable device 10 by using various types of identification information. For example, biometric information of the user, password, or voice may be used as user identification information for user authorization. The biometric information of the user may include at least one of iris data, fingerprint data, voice pattern information (or, voice fingerprint data), or facial data of the user, but is not limited thereto and thus may include various types of biometric information. The user identification information that may be used for user authorization is not limited to the aforementioned examples and may be variously set. The wearable device 10 may store the user identification information in a memory or a database, and may authorize the user by comparing the stored user identification information with information about the user wearing the wearable device 10. Also, the wearable device 10 may receive the user identification information from the electronic device 20, an external network, or a server.

According to an embodiment of the disclosure, when the user identification information about the user wearing the wearable device 10 is neither pre-stored in the wearable device 10 nor obtained from the electronic device 20, the external network, or the server, the wearable device 10 may newly obtain and store identification information about the user. The stored identification information may be used in authorizing the same user at a later time.

According to an embodiment of the disclosure, the wearable device 10 does not separately authorize the user, and may perform operations 220 to 260 on a random user wearing the wearable device 10. That is, operation 210 may be skipped, and identification information of the wearable device 10 may be used by the electronic device 20 to authorize the wearable device 10.

In operation 220, the wearable device 10 according to an embodiment of the disclosure may identify a first key layout of an input device 30 (see FIG. 15) connected to the electronic device 20 used by the authorized user.

The wearable device 10 may identify the first key layout of the input device 30 by using one of various methods. For example, the wearable device 10 may identify the input device 30 by using an optical device (e.g., a camera) connected to the wearable device 10 in a wired or wireless manner, and may identify the first key layout by performing image processing on an image of the input device 30. Also, the wearable device 10 may receive information about the first key layout from the electronic device 20 or the input device 30. Also, the wearable device 10 may receive an input of the first key layout from a user via a user interface provided to the user. Also, the wearable device 10 may obtain identification information (e.g., a type, a model name, a serial number, or the like of an input device) of the input device 30, and may search for the obtained identification information in an internal memory or an external server, thereby obtaining the information about the first key layout.

Also, the wearable device 10 may provide the user with selection items (e.g., a 108-key keyboard, an 86-key keyboard, keyboard languages, bank ATMs, numeric keypad, etc.) with respect to the input device 30 via the user interface, and may determine the first key layout, based on selection by the user.

In operation 230, the wearable device 10 according to an embodiment of the disclosure may generate mapping information in which at least one key in the first key layout is mapped to a different key.

The wearable device 10 may map at least one key in the first key layout is mapped to a different key, according to one of various mapping schemes. For example, the wearable device 10 may change (transposing) the order of keys in the first key layout, or may randomly map at least one key to a different key. Also, a key mapping module 1730 (see FIG. 17) may generate a random function for changing an arrangement or the order of elements in a preset group, and may apply the random function to the first key layout, thereby generating the mapping information.

Also, the wearable device 10 may map some keys or all keys in the first key layout of the input device 30 to different keys. An example in which the wearable device 10 generates the mapping information will be described with reference to FIG. 3.

In operation 240, the wearable device 10 according to an embodiment of the disclosure may display, on the display 12 of the wearable device 10, a second key layout in which the first key layout is mapped according to the mapping information.

According to an embodiment of the disclosure, the second key layout indicates a key layout in which keys in the first key layout of the input device 30 are mapped according to the mapping information. A type of the second key layout may be equal to or similar to a type of the input device 30. For example, when the input device 30 is a keyboard and the first key layout is a 108-key layout, the type of the second key layout may also be a keyboard having a 108-key layout. Also, when the input device 30 is a 12-key keypad, the type of the second key layout may also be a 12-key keypad. The type of the second key layout may not indicate an entire form of the input device 30 but may indicate only an arrangement of a plurality of keys included in the input device 30. A form and position where the second key layout is to be displayed may vary. An example in which the wearable device 10 displays the second key layout will be described with reference to FIG. 4.

Also, according to an embodiment of the disclosure, the wearable device 10 may display the mapping information. The mapping information may include keys in the first key layout of the input device 30, and keys of the second key layout respectively mapped to the keys in the first key layout. The mapping information may be displayed using various methods, and for example, the mapping information may be displayed as a table. The mapping information may be displayed along with the second key layout or may be displayed instead of the second key layout. A method of displaying the second key layout may be applied to a method, performed by the wearable device 10, of displaying the mapping information, and thus, detailed descriptions thereof are omitted here.

In operation 250, based on the second key layout and an input of an authorized user with respect to the input device 30, the wearable device 10 according to an embodiment of the disclosure may determine second content as content input by the authorized user.

According to an embodiment of the disclosure, the user may input content by using the second key layout displayed on the wearable device 10, and the input device 30. However, a key that is actually selected from the input device 30 by the user is a key of the first key layout of the input device 30. Therefore, the wearable device 10 may identify which key in the second key layout corresponds to the key of the input device 30 which is selected by the user, and may determine the identified key as a key input by the user. Also, the wearable device 10 may obtain information about the key of the input device 30 which is selected by the user, may convert the obtained information according to the mapping information, and may determine a key corresponding to the obtained information, as a key input by the user.

In the disclosure, first content and second content are terms used to distinguish between content (the first content) according to the key of the input device 30 which is selected by the user and content (the second content) that the user actually attempts to input. That is, the first content indicates content determined based on a user input with respect to the first key layout of the input device 30 and the input device 30, and the second content indicates content mapped to the first content according to the mapping information. In this regard, the first content and the second content are mutually mapped to each other. The fact that the first content and the second content are mutually mapped to each other according to the mapping information means that a plurality of characters included in the second content and a plurality of characters included in the first content are respectively mapped according to the mapping information. An example of a method by which the wearable device 10 obtains the user input and the second content will be described with reference to FIG. 6.

In operation 260, the wearable device 10 according to an embodiment of the disclosure may display the second content on the display 12 of the wearable device 10.

According to an embodiment of the disclosure, the wearable device 10 may display the second content by using one of various methods. For example, first content according to a key of the input device 30, the key being selected by the user, may be displayed on the display 22 of the electronic device 20, and the wearable device 10 may display second content by overlaying the second content on the first content. Also, the wearable device 10 may display the second content at a position different from that of the first content, such that the user can identify both the first content and the second content. Also, the wearable device 10 may identify the first content displayed on the electronic device 20, may perform image processing to prevent the first content from being displayed on the display 12 of the wearable device 10, and may display only the second content.

Referring to FIG. 1, '5, 6, 7, 8' that is the first content may be displayed on the display 22 of the electronic device 20, according to an input of the user 101 with respect to the input device 103. 'o, 6, /, n' that is the second content mapped to the first content according to the mapping information may be displayed on the display 12 of the wearable device 10.

Referring back to FIG. 2, the wearable device 10 according to an embodiment of the disclosure may change an operation mode of displaying content. For example, the wearable device 10 may operate according to at least one of a 'default mode' of not displaying second content, a 'first mode' of displaying first content and second content, a 'third mode' of displaying second content by overlaying the second content on first content, or a 'fourth mode' of not displaying first content but displaying only second content. The operation mode of the wearable device 10 may be changed based on a user input via a user interface provided from the wearable device 10 to the user.

Also, according to an embodiment of the disclosure, the second content may not be displayed on the wearable device 10. For example, the wearable device 10 may generate the mapping information and display only the second key layout, and the electronic device 20 may convert the first content input by the user via the input device 30 to the second content and use the second content.

As described above, the wearable device 10 according to an embodiment of the disclosure may display the second key layout only on the display 12 of the wearable device 10 so as to prevent a nearby person from identifying the second key layout, and may allow the user to input content according to the second key layout, such that security with respect to the second content may be enhanced.

Figure 3:
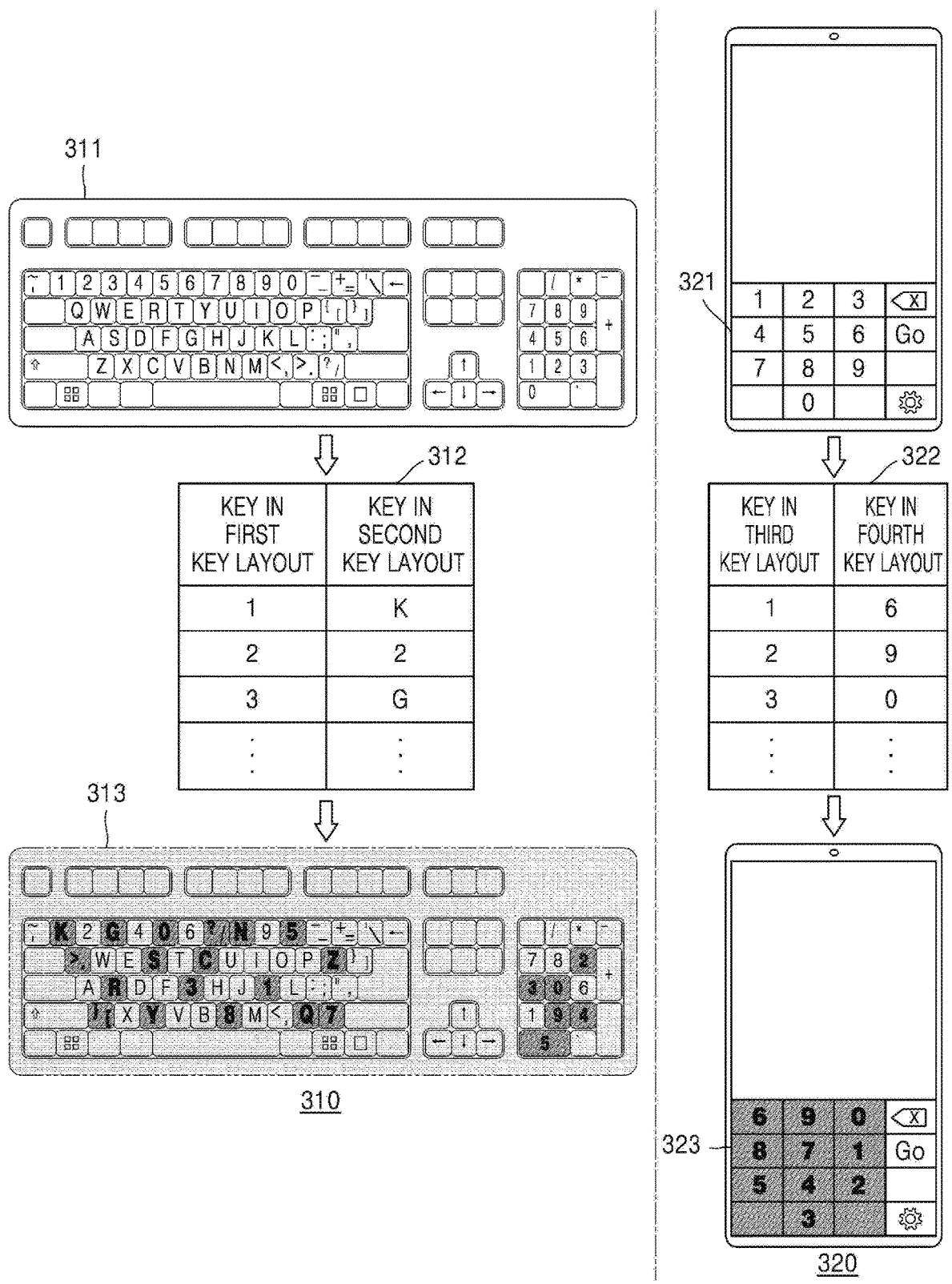
FIG. 3 is a diagram for describing a method of generating mapping information, the method being performed by the wearable device, according to an embodiment of the disclosure.

FIG. 3 is a diagram for describing a method of generating mapping information, the method being performed by the wearable device 10, according to an embodiment of the disclosure.

Referring to FIG. 3, it illustrates a first example 310 in which the input device 30 connected to the electronic device 20 is a keyboard 311 and a second example 320 in which the input device 30 connected to the electronic device 20 is a numeric keypad 321.

In the first example 310, at least one key in a first key layout of the keyboard 311 that is the input device 30 connected to the electronic device 20 is mapped to a different key. The wearable device 10 may generate first mapping information 312 in which at least one key in the first key layout of the keyboard 311 is mapped to a different key. For example, '1, 2, 3' keys in the first key layout may be respectively mapped to 'K, 2, G' keys. Also, the wearable device 10 may display, on a display of the wearable device 10, a second key layout 313 to which the first key layout is mapped according to the first mapping information 312.

A user may input content by using the second key layout 313 and the keyboard 311. For example, when the user attempts to input 'G', the user may identify a position of 'G' in the second key layout 313, and may select '3' in the keyboard 311, wherein '3' is a key corresponding to 'G' in the second key layout 313. The electronic device 20 may obtain information indicating an input of '3' from the keyboard 311, may convert '3' to 'G' according to the first mapping information 312 received from the wearable device 10, and then may perform an operation associated with 'G' input by the user.

Also, according to an embodiment of the disclosure, the wearable device 10 may display the first mapping information 312. The wearable device 10 may display both the first mapping information 312 and the second key layout 313 or may display only the first mapping information 312, instead of the second key layout 313. The user may input content by using the first mapping information 312 and the keyboard 311. For example, when the user attempts to input 'G', the user may identify, from the first mapping information 312, '3' that is a key before mapping and corresponds to mapped 'G', and then may input 'G' by selecting '3' in the keyboard 311. The electronic device 20 may obtain information indicating an input of '3' from the keyboard 311, may convert '3' to 'G' according to the first mapping information 312 received from the wearable device 10, and then may perform an operation associated with 'G' input by the user.

In the second example 320, all keys in a third key layout of a numeric keypad 321 are mapped to different keys. The numeric keypad 321 may not be a device that is physically distinguished from the electronic device 20 but may be a user interface displayed on the electronic device 20. That is, the input device 30 may indicate the electronic device 20 including a user interface capable of obtaining a user input. A method, performed by the wearable device 10, of generating second mapping information 322 with respect to the numeric keypad 321 and displaying a fourth key layout 323 is the same as that described with reference to the first example 310, and thus detailed descriptions thereof are omitted.

Figure 4:
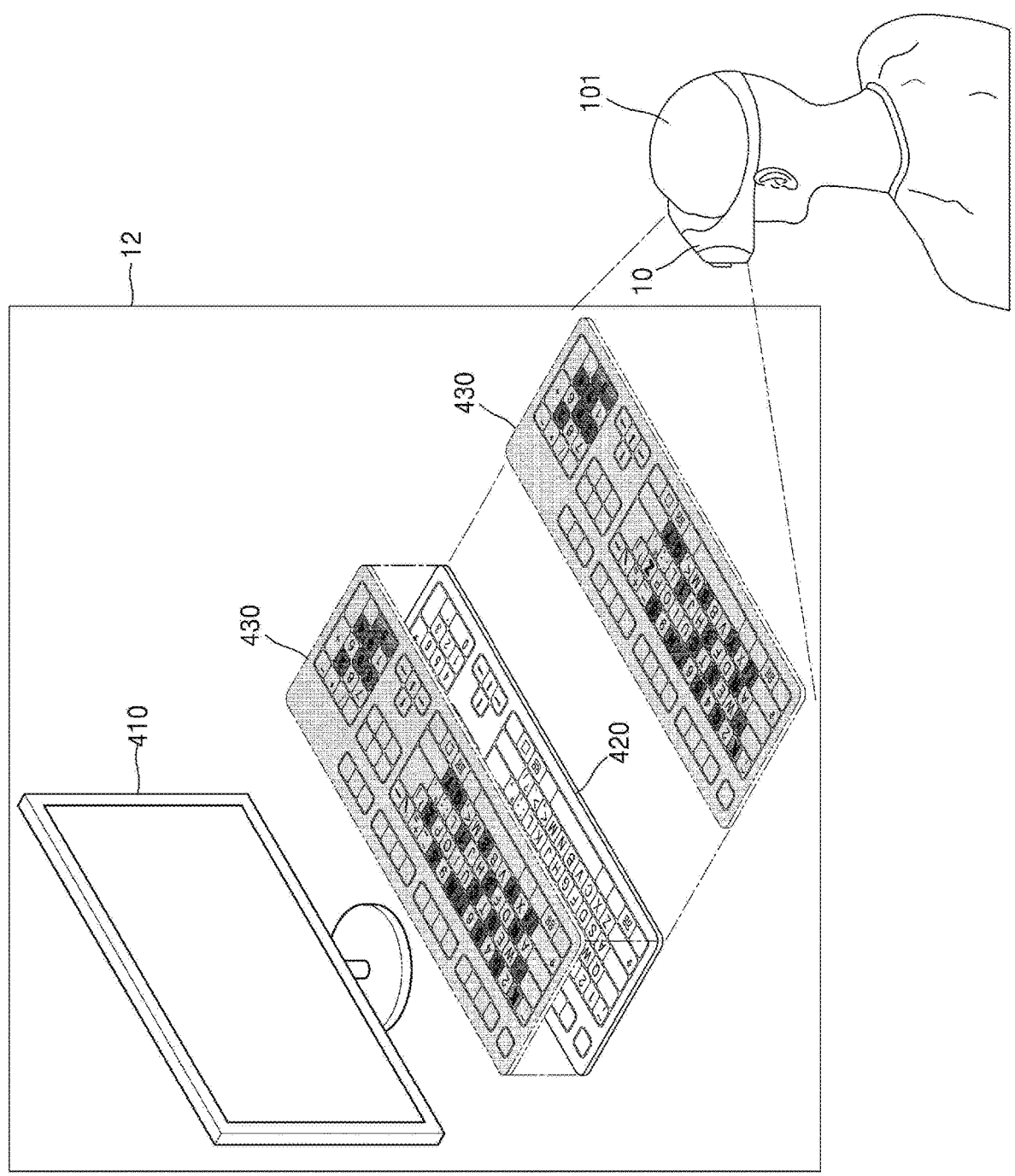
FIG. 4 is a diagram for describing a method of displaying a second key layout, according to an embodiment of the disclosure.

FIG. 4 is a diagram for describing a method of displaying a second key layout, according to an embodiment of the disclosure.

Referring to FIG. 4, a user 101 uses an electronic device 410 while using a keyboard as an input device 420, and wears the wearable device 10. The wearable device 10 displays a second key layout 430 in which at least one key in a first key layout of the input device 420 is mapped to a different key.

According to an embodiment of the disclosure, the wearable device 10 may display the second key layout 430 by overlaying the second key layout 430 on the input device 420. To make the overlaid second key layout 430 easily identified, the wearable device 10 may identify the input device 420 and may blurredly display the input device 420 by performing image processing. Alternatively, the wearable device 10 may perform image processing to make the input device 420 invisible on the display of the wearable device 10. Alternatively, the wearable device 10 may display the overlaid second key layout 430 by marking the overlaid second key layout 430 in bold or emphasizing (e.g., highlighting) the overlaid second key layout 430. When the second key layout 430 is displayed while being overlaid on the input device 420, to input content, the user 101 may view the input device 420 and identify the second key layout 430 to which the first key layout of the input device 420 is mapped.

Also, to allow the input device 420 and the second key layout 430 to be easily distinguished therebetween, the wearable device 10 may display the second key layout 430 after a predetermined distance from the input device 420. Also, the second key layout 430 may be displayed at a position different from a position of the input device 420. For example, the second key layout 430 may be displayed at an upper end, a lower end, a left side, or a right side of the input device 420, or at an upper end, a lower end, a left side, or a right side of the electronic device 410. Also, the second key layout 430 may be displayed at a position irrelevant to positions of the input device 420 and the electronic device 410.

According to an embodiment of the disclosure, when a key is selected in response to a user input to the input device 420, the wearable device 10 may emphasize a display of a key in the second key layout 430, the key corresponding to the selected key. For example, in a case where the user 101 selects 'F' key in the input device 420 and the 'F' key corresponds to '3' key, the wearable device 10 may emphasize a display of '3' key in the displayed second key layout 430. An emphasized display method may vary, and for example, may include a highlight display method.

Figure 5:
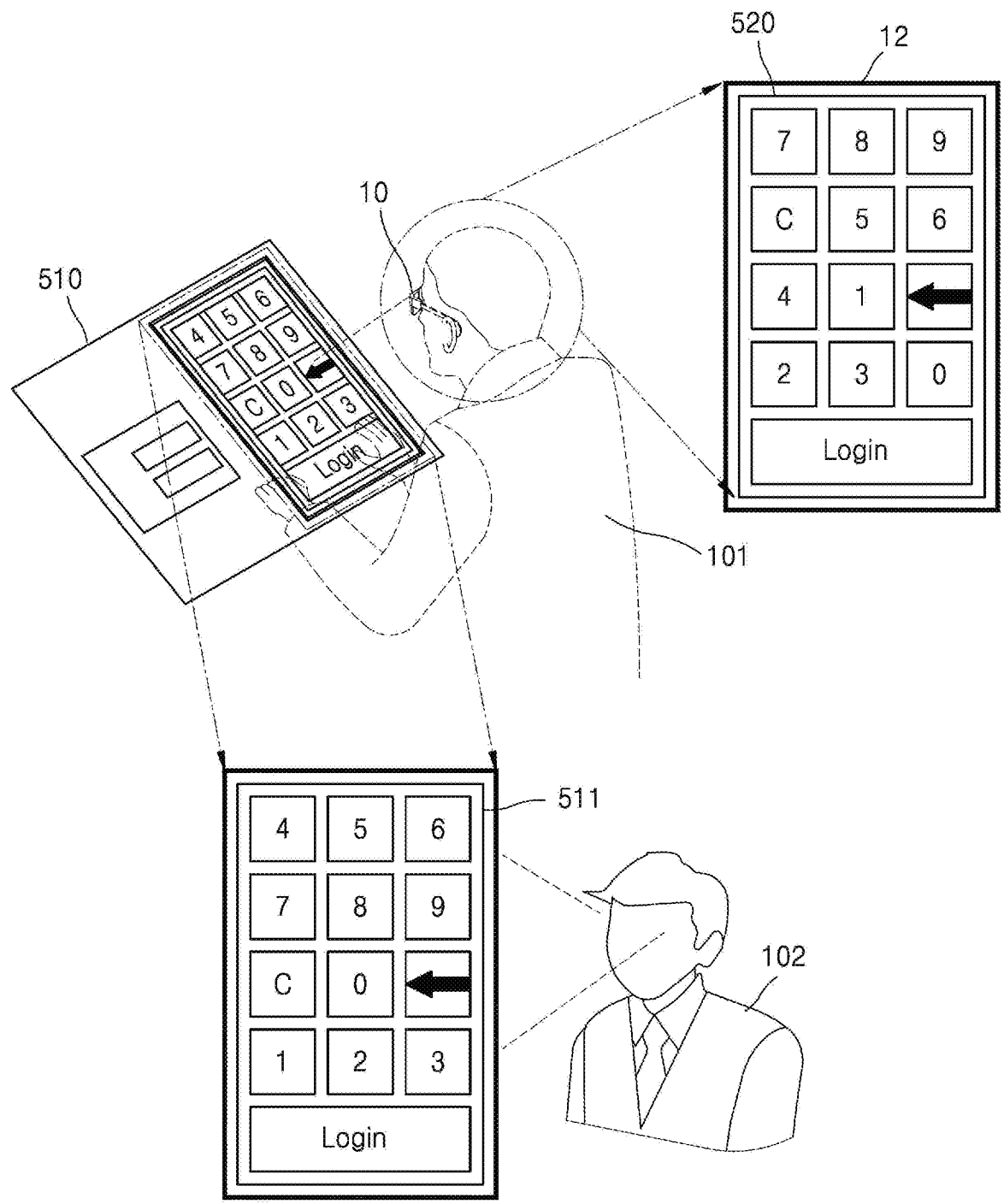
FIG. 5 is a diagram for describing a method, performed by the wearable device, of displaying a second key layout while communicating with an automated teller machine (ATM) of a bank, according to an embodiment of the disclosure.

FIG. 5 is a diagram for describing a method, performed by the wearable device 10, of displaying a second key layout while communicating with an ATM of a bank, according to an embodiment of the disclosure.

Referring to FIG. 5, the user 101 wears the wearable device 10 and uses an ATM 510 of a bank via a numeric keypad 511 connected to the ATM 510. The numeric keypad 511 may be a physical keypad arranged at the ATM 510 or may be a user interface that the ATM 510 provides via a display. Because a nearby person 102 is present around the user 101 who uses the ATM 510, a personal identification number (PIN) input by the user 101 via the numeric keypad 511 may be exposed to the nearby person 102.

According to an embodiment of the disclosure, the wearable device 10 may display, on the display 12, a second key layout 520 in which at least one key in the numeric keypad 511 is mapped to a different key. The user 101 may input content such as a PIN by using the numeric keypad 511 according to the mapped second key layout 520. The ATM 510 may convert input first content according to mapping information received from the wearable device 10, thereby obtaining second content intended by a user input. Alternatively, the ATM 510 may receive the second content from the wearable device 10. The ATM 510 may perform an operation associated with the second content. For example, the ATM 510 may identify the second content as a PIN input by the user 101, and may determine whether the PIN matches with a PIN of a bank account.

However, the nearby person 102 cannot see the second key layout 520 displayed on the wearable device 10 and only sees the numeric keypad 511 of the ATM 510, so that the nearby person 102 cannot identify the second content intended by the user 101. Also, even when the nearby person 102 is wearing the wearable device 10 of the user 101 or is wearing another wearable device, when the nearby person 102 is not verified as an authorized user, the wearable device 10 does not display the second key layout 520. According to an embodiment of the disclosure described above, personal information related to banking can be protected against shoulder surfing.

Figure 6:
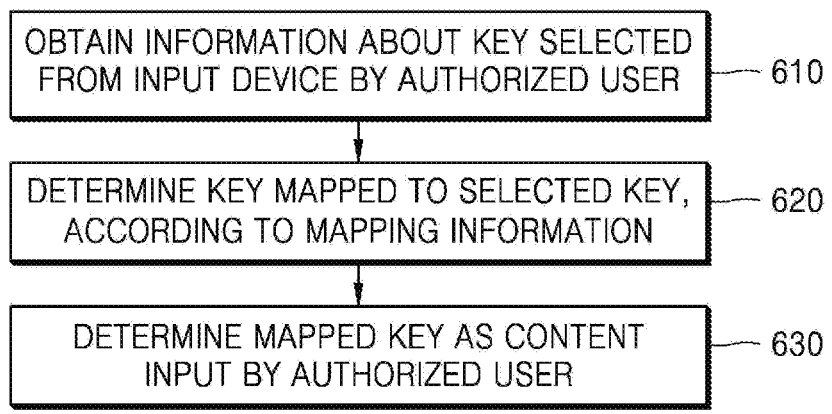
FIG. 6 is a flowchart for describing a method, performed by the wearable device, of obtaining content input by a user, according to an embodiment of the disclosure.

FIG. 6 is a flowchart for describing a method, performed by the wearable device 10, of obtaining content input by a user, according to an embodiment of the disclosure. The method of FIG. 6 may correspond to an embodiment of operation 250 in the flowchart of FIG. 2.

Referring to FIG. 6, in operation 610, the wearable device 10 according to an embodiment of the disclosure may obtain information about a key selected from the input device 30 by an authorized user.

According to an embodiment of the disclosure, the wearable device 10 may obtain, by using one of various methods, information about a key selected from the input device 30 by a user. For example, the wearable device 10 may identify the input device 30 by using an optical device (e.g., a camera) connected to the wearable device 10 in a wired or wireless manner, and may identify a first key layout by performing image processing on an image of the input device 30. The wearable device 10 may identify which key is selected from the input device 30 by a user using the optical device, and may identify which key is selected based on the first key layout. That is, the wearable device 10 may directly detect information about a key selected from the input device 30 by a user, and thus may obtain the information.

Also, the wearable device 10 may communicate with the electronic device 20 or the input device 30, and then may receive, from the electronic device 20 or the input device 30, the information about the key selected from the input device 30 by the user. Also, the wearable device 10 may receive, from the user via a user interface provided to the user, an input of information indicating which key the user selects from the input device 30.

In operation 620, the wearable device 10 according to an embodiment of the disclosure may determine a key mapped to the selected key, according to mapping information. That is, the wearable device 10 may identify a key that is mapped to a selected key according to the mapping information, the selected key having been selected from the first key layout of the input device 30 by the user.

In operation 630, the wearable device 10 according to an embodiment of the disclosure may determine the mapped key as content input by the authorized user. That is, the wearable device 10 may not determine, as user-input content, first content determined based on the first key layout of the input device 30 and a user input with respect to the input device 30, and may determine, as the user-input content, second content mapped according to first content and mapping information.

Also, according to an embodiment of the disclosure, the wearable device 10 may receive the second content from the electronic device 20, instead of performing operations 610 to 630. For example, the wearable device 10 may transmit the mapping information to the electronic device 20. The electronic device 20 may obtain information about the key selected from the input device 30 by the user, and may determine a key mapped to the selected key, according to the mapping information. The electronic device 20 may determine the mapped key as the second content input by the user, and may transmit the second content to the wearable device 10. The wearable device 10 may display the received second content on the display of the wearable device 10.

Operations of the wearable device 10 according to various embodiments of the disclosure are described above. Operations of the electronic device 20 according to various embodiments of the disclosure will now be described with reference to FIG. 7.

Figure 7:
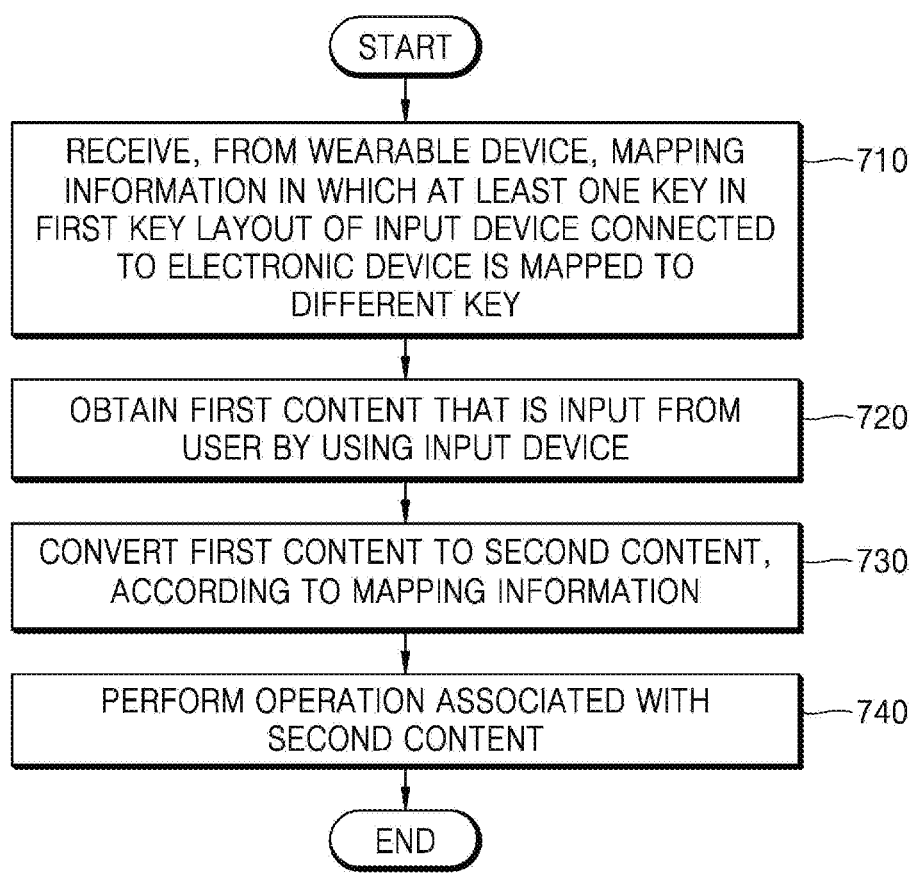
FIG. 7 is a flowchart for describing a method, performed by an electronic device, of performing an operation associated with second content, according to an embodiment of the disclosure.

FIG. 7 is a flowchart for describing a method, performed by the electronic device 20, of performing an operation associated with second content, according to an embodiment of the disclosure.

Referring to FIG. 7, in operation 710, the electronic device 20 according to an embodiment of the disclosure may receive, from the wearable device 10, mapping information in which at least one key in a first key layout of the input device 30 connected to the electronic device 20 is mapped to a different key. The mapping information received from the wearable device 10 corresponds to mapping information described with reference to FIG. 2.

According to an embodiment of the disclosure, before the electronic device 20 receives the mapping information from the wearable device 10, the electronic device 20 may connect communication with the wearable device 10. The electronic device 20 and the wearable device 10 may identify each other and may be mutually connected in a wired or wireless manner. Also, before the electronic device 20 receives the mapping information, the electronic device 20 may authorize the wearable device 10 or a user of the wearable device 10. For example, the electronic device 20 may store a reliable electronic device list or a reliable user list in its internal memory, or may request an external server for the reliable electronic device list or the reliable user list and receive it. When identification information of the wearable device 10 or identification information of the user of the wearable device 10 is included in the reliable electronic device list or the reliable user list, the electronic device 20 may receive the mapping information from the wearable device 10.

Also, according to an embodiment of the disclosure, the electronic device 20 may directly generate the mapping information, instead of receiving the mapping information from the wearable device 10. A method by which the electronic device 20 directly generates mapping information may correspond to a method by which the wearable device 10 generates the mapping information. The electronic device 20 may transmit the generated mapping information to the wearable device 10, and the wearable device 10 may generate and display a second key layout, based on the received mapping information.

In operation 720, the electronic device 20 according to an embodiment of the disclosure may obtain first content that is input from the user by using the input device 30. The first content indicates content that is determined based on the first key layout of the input device 30 and a user input with respect to the input device 30. The electronic device 20 may obtain the first content input from the user by using the input device 30 that is connected to the electronic device 20 in a wired or wireless manner or is provided as a user interface of the electronic device 20.

In operation 730, the electronic device 20 according to an embodiment of the disclosure may convert the first content to second content, according to the mapping information. A method by which the electronic device 20 converts the first content to the second content according to the mapping information may correspond to a method by which the wearable device 10 converts the first content to the second content according to the mapping information.

Also, according to an embodiment of the disclosure, the electronic device 20 may receive the second content from the wearable device 10, instead of performing operation 730. A method by which the electronic device 20 receives the second content from the wearable device 10 will be described in detail with reference to FIG. 9.

In operation 740, the electronic device 20 according to an embodiment of the disclosure may perform an operation associated with the second content.

According to an embodiment of the disclosure, the operation associated with the second content may include various operations performed by using the second content. For example, the operation associated with the second content may include at least one of an operation of storing the second content, an operation of transmitting the second content to an external device, an operation of authorizing a secure session by using the second content, or an operation of performing a preset process corresponding to the second content.

For example, in a case where the user is writing a text, the electronic device 20 may store, in the electronic device 20, the second content that is the text written by the user. Also, in a case where the second content input by the user is security information such as a PIN or the like, the electronic device 20 may transmit the second content to an external device for user authorization, and may authorize, by using the second content, a secure session for the user to access predefined information. Also, in a case where the second content is an input for triggering a preset process in the electronic device 20, the electronic device 20 may perform the preset process corresponding to the second content. However, the aforementioned operations are only examples, and types of the second content and the operation associated with the second content, the operation being performable by the electronic device 20, are not limited to the aforementioned examples.

The second content may be security information that should not be recognized by a nearby person or an adjacent optical device, except for the user of the wearable device 10. Therefore, the electronic device 20 does not display the second content. The electronic device 20 may display the first content, instead of displaying the second content. That is, the electronic device 20 may display a user input, according to the first key layout of the input device 30, the user input being input by using the input device 30. When a target of the user input is security information such as a PIN, the wearable device 20 may display random characters such as "****", instead of the first content.

According to an embodiment of the disclosure, before the electronic device 20 performs the operation associated with the second content, the electronic device 20 may authorize the wearable device 10 or the user of the wearable device 10. An authorization method may correspond to the descriptions provided above in operation 710. Also, even when the electronic device 20 authorized the wearable device 10 or the user of the wearable device 10 in operation 710, the electronic device 20 may additionally authorize the wearable device 10 or the user of the wearable device 10 for security before operation 740 is performed.

As described above, the electronic device 20 according to an embodiment of the disclosure may not display the second content that is converted from the first content according to the mapping information, the first content being input according to the first key layout, and may perform the operation associated with the second content, so that security with respect to the second content may be enhanced.

Hereinafter, with reference to FIGS. 8 and 9, a method by which the wearable device 10 and the electronic device 20 perform operations and exchange information with each other will be described.

Figure 8:
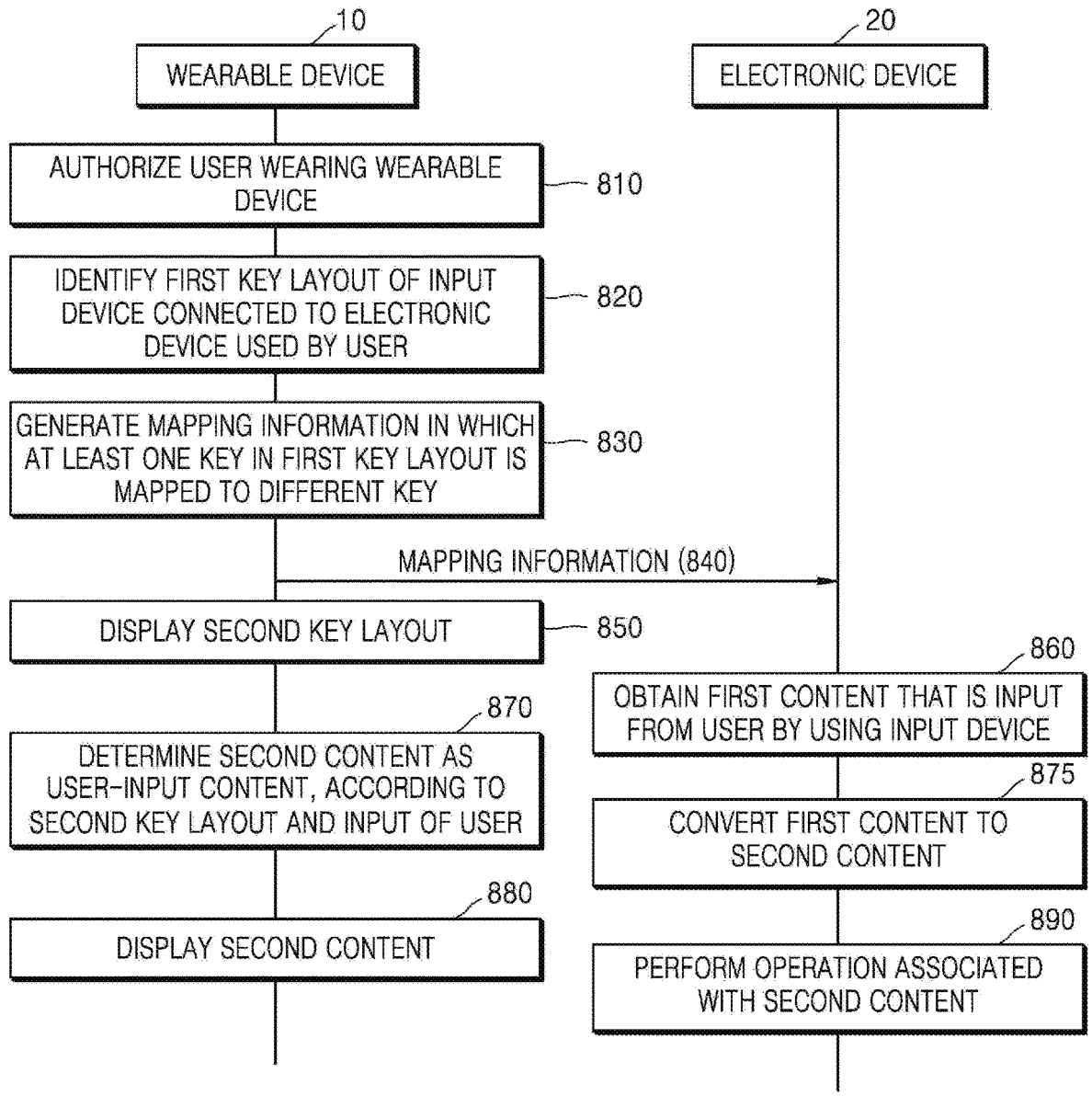
FIG. 8 is a flowchart for describing a method, performed by the wearable device, of transmitting mapping information to the electronic device, according to an embodiment of the disclosure.

FIG. 8 is a flowchart for describing a method, performed by the wearable device 10, of transmitting mapping information to the electronic device 20, according to an embodiment of the disclosure.

Referring to FIG. 8, in operation 810, the wearable device 10 according to an embodiment of the disclosure may authorize a user wearing the wearable device 10.

In operation 820, the wearable device 10 according to an embodiment of the disclosure may identify a first key layout of the input device 30 connected to the electronic device 20 used by the user.

In operation 830, the wearable device 10 according to an embodiment of the disclosure may generate mapping information in which at least one key in the first key layout is mapped to a different key.

In operation 840, the wearable device 10 according to an embodiment of the disclosure may transmit the generated mapping information to the electronic device 20. Before the wearable device 10 transmits the mapping information, the wearable device 10 may connect communication with the electronic device 20. The electronic device 20 and the wearable device 10 may identify each other and may be mutually connected in a wired or wireless manner. Also, before the electronic device 20 receives the mapping information, the electronic device 20 may authorize the wearable device 10 or the user of the wearable device 10. For example, the electronic device 20 may store a reliable electronic device list or a reliable user list in its internal memory, or may request an external server for the reliable electronic device list or the reliable user list and receive it. When identification information of the wearable device 10 or identification information of the user of the wearable device 10 is included in the reliable electronic device list or the reliable user list, the electronic device 20 may receive the mapping information from the wearable device 10.

In operation 850, the wearable device 10 according to an embodiment of the disclosure may display, on the display of the wearable device 10, a second key layout in which the first key layout is mapped according to the mapping information.

In operation 860, the electronic device 20 according to an embodiment of the disclosure may obtain first content that is input from the user by using the input device 30.

In operation 870, the wearable device 10 according to an embodiment of the disclosure may determine second content as user-input content, according to the second key layout and the input of the user.

In operation 875, the electronic device 20 according to an embodiment of the disclosure may convert the first content to the second content, according to the mapping information.

In operation 880, the wearable device 10 according to an embodiment of the disclosure may display the second content.

In operation 890, the electronic device 20 according to an embodiment of the disclosure may perform an operation associated with the second content.

Operations 810, 820, 830, 850, 870, and 880 of FIG. 8 may respectively correspond to operations 210, 220, 230, 240, 250, and 260 of FIG. 2. Also, operations 860, 875, and 890 of FIG. 8 may respectively correspond to operations 720, 730, and 740 of FIG. 7. Therefore, descriptions of operations of FIG. 8 which correspond to those of FIG. 2 or 7 are not provided here.

Figure 9:
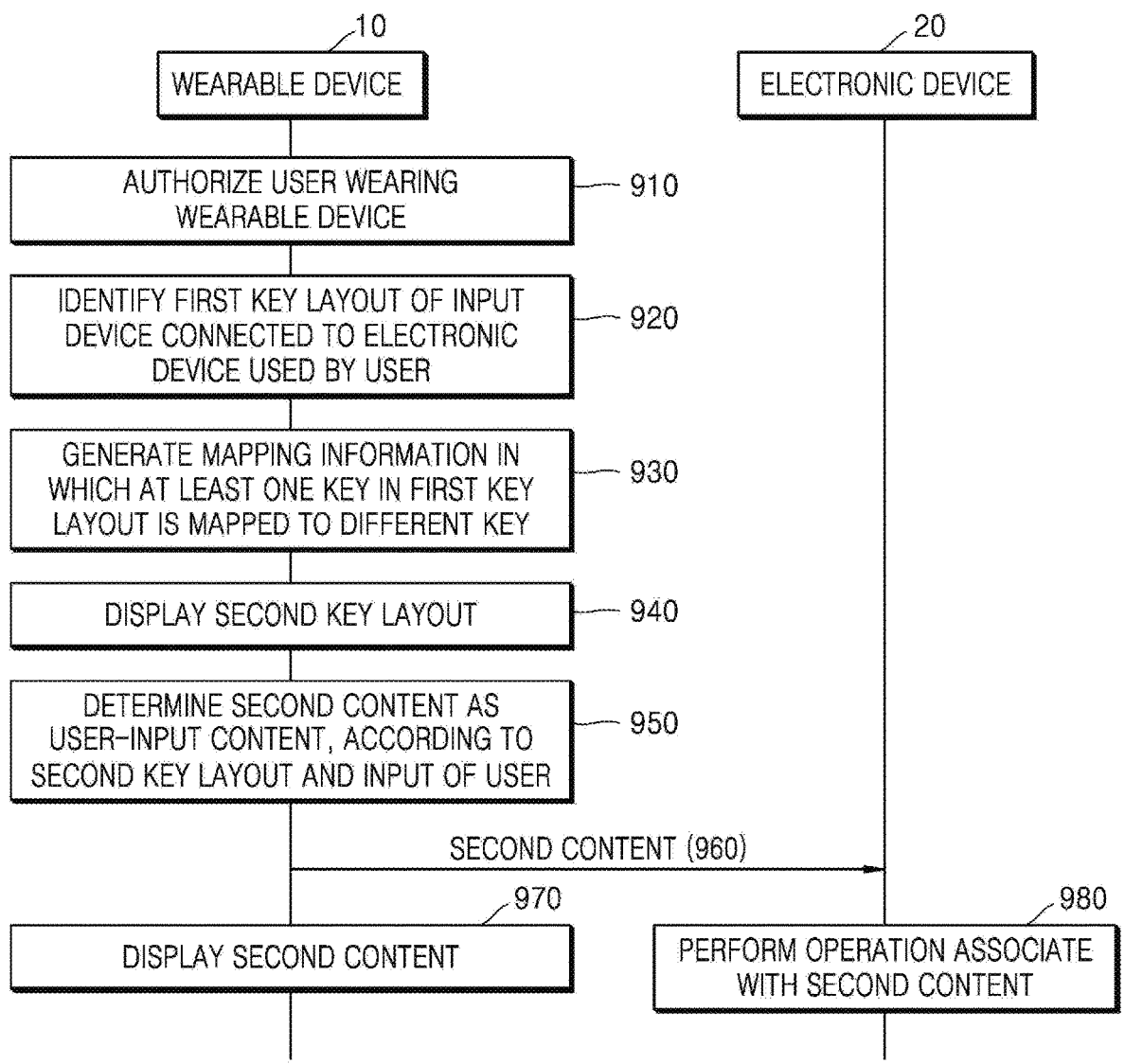
FIG. 9 is a flowchart for describing a method, performed by the wearable device, of transmitting second content to the electronic device, according to an embodiment of the disclosure.

FIG. 9 is a flowchart for describing a method, performed by the wearable device 10, of transmitting second content to the electronic device 20, according to an embodiment of the disclosure.

Referring to FIG. 9, in operation 910, the wearable device 10 according to an embodiment of the disclosure may authorize a user wearing the wearable device 10.

In operation 920, the wearable device 10 according to an embodiment of the disclosure may identify a first key layout of the input device 30 connected to the electronic device 20 used by the user.

In operation 930, the wearable device 10 according to an embodiment of the disclosure may generate mapping information in which at least one key in the first key layout is mapped to a different key.

In operation 940, the wearable device 10 according to an embodiment of the disclosure may display, on the display of the wearable device 10, a second key layout in which the first key layout is mapped according to the mapping information.

In operation 950, the wearable device 10 according to an embodiment of the disclosure may determine second content as user-input content, according to the second key layout and the input of the user.

In operation 960, the wearable device 10 according to an embodiment of the disclosure may transmit the second content to the electronic device 20.

When the wearable device 10 transmits the mapping information to the electronic device 20 as in operation 840 of FIG. 8, there may be a risk that the mapping information is externally exposed due to a security attack such as hacking with respect to the electronic device 20. When the mapping information is externally exposed, an attacker who obtained the mapping information may obtain the second content by identifying which key the user selects from the first key layout of the input device 30. That is, all types of content mapped according to the mapping information may be exposed to security vulnerability. Therefore, according to an embodiment of the disclosure, the wearable device 10 may not transmit the mapping information to the electronic device 20 but may transmit, to the electronic device 20, the second content to which the first content is mapped according to the mapping information. Even when the second content is being transmitted to the electronic device 20, there may be a risk that the second content is exposed due to a security attack with respect to the electronic device 20. However, the attacker cannot obtain the second content by only identifying which key the user selected from the first key layout of the input device 30, and has to hack the second content from the electronic device 20 every time, such that a case where the wearable device 10 transmits the second content to the electronic device 20 may be safer in terms of security, compared to a case where the mapping information is leaked.

In operation 970, the wearable device 10 according to an embodiment of the disclosure may display the second content.

In operation 980, the electronic device 20 according to an embodiment of the disclosure may perform an operation associated with the second content.

Operations 910, 920, 930, 940, 950, and 970 of FIG. 9 may respectively correspond to operations 210, 220, 230, 240, 250, and 260 of FIG. 2. Also, operation 980 of FIG. 9 may correspond to operation 740 of FIG. 7. Therefore, descriptions of operations of FIG. 9 which correspond to those of FIG. 2 or 7 are not provided here.

Referring to FIGS. 8 and 9, the wearable device 10 and the electronic device 20 according to an embodiment of the disclosure may exchange information such as mapping information or content by using a direct communication scheme therebetween, not using an external network. Also, the wearable device 10 may not receive mapping information via the external network but may directly generate the mapping information. As described above, the wearable device 10 and the electronic device 20 may use the direct communication scheme, thereby protecting user content against hacking with respect to the external network or attacks including spoofing, snooping, sniffing, or the like that illegitimately gain the information.

Hereinafter, with reference to FIG. 10, a method of doubly protecting security of content by using additional mapping information will now be described.

Figure 10:
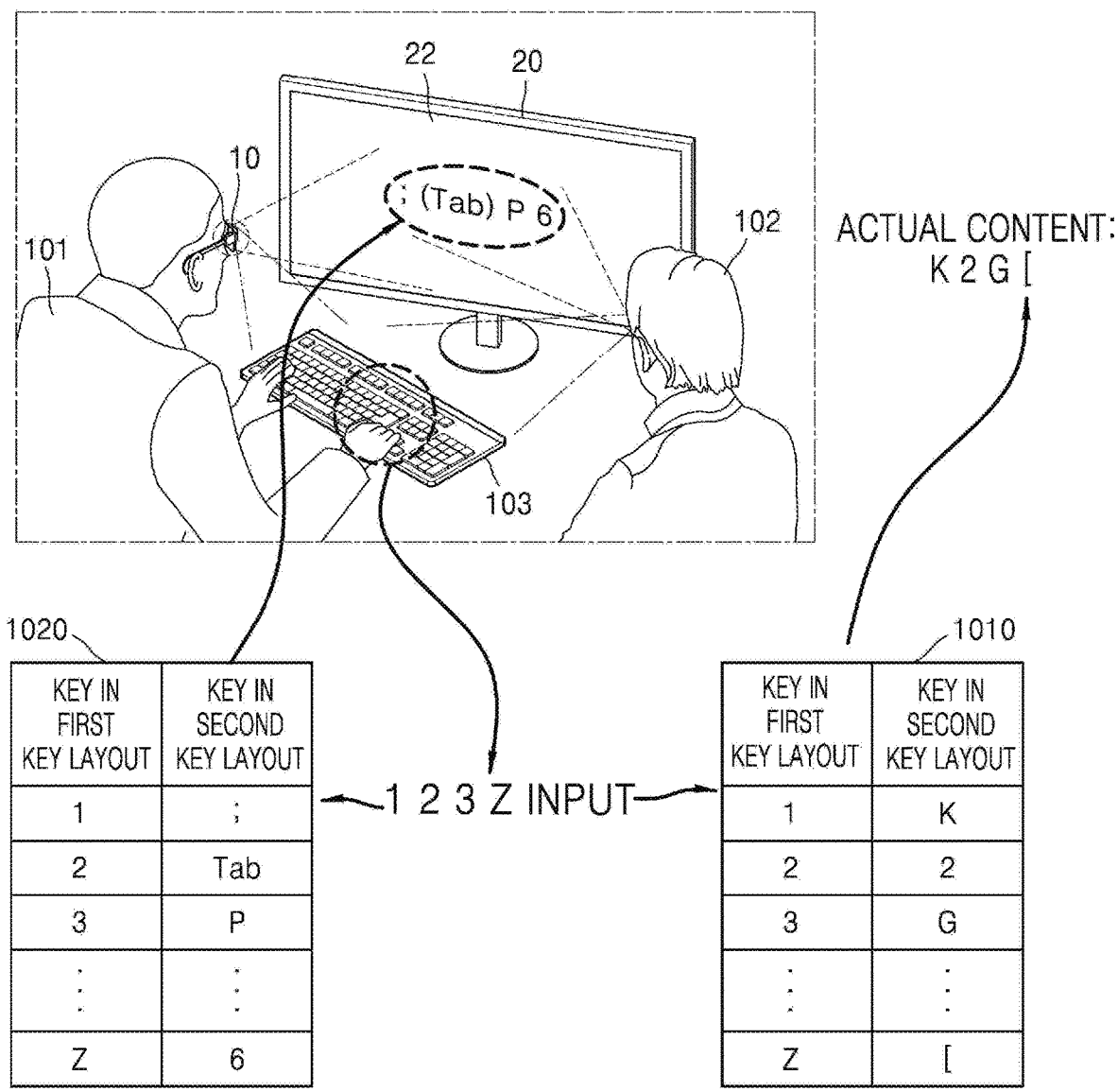
FIG. 10 is a diagram for describing a method, performed by the electronic device, of enhancing security of content by using additional mapping information, according to an embodiment of the disclosure.

FIG. 10 is a diagram for describing a method, performed by the electronic device 20, of enhancing security of content by using additional mapping information 1020, according to an embodiment of the disclosure.

Referring to FIG. 10, a user 101 wearing the wearable device 10 inputs content to the electronic device 20 by using the input device 103. At least one key in a first key layout of the input device 103 is mapped to a different key according to mapping information 1010 and this is the same as descriptions provided with reference to FIGS. 1 to 9. That is, in a case where the user 101 attempts to input 'K 2 G [' (second content) as actual content, the user 101 may input '1 2 3 Z' (first content) to the input device 103.

According to an embodiment of the disclosure, the wearable device 10 may generate the additional mapping information 1020 in which at least one key in the first key layout of the input device 103 is mapped to a different key. The additional mapping information 1020 is mapping information used when first content is converted to third content and then is displayed on the display 22 of the electronic device 20, the first content being input by the user 101 using the input device 103.

The wearable device 10 may transmit the additional mapping information 1020 to the electronic device 20. The electronic device 20 may convert the first content to the third content, based on the additional mapping information 1020, the first content being input by the user 101 using the input device 103, and may display the third content. For example, when the user 101 selects '1 2 3 Z' (first content) from the first key layout of the input device 103, '; (Tab) P 6' (third content) may be displayed on the display 22 of the electronic device 20. However, content that is actually attempted to be input by the user 101 may be 'K 2 G [' (second content) that is content the user 101 selected by using a second key layout displayed on the wearable device 10 according to the mapping information 1010. That is, the third content converted based on the additional mapping information 1020 may be different from the second content attempted to be input by the user 101.

According to an embodiment of the disclosure, the additional mapping information 1020 may be generated by the electronic device 20. The electronic device 20 may transmit or may not transmit the additional mapping information 1020 to the wearable device 10.

According to an embodiment of the disclosure, a method by which the wearable device 10 obtains the second content will now be described. When the electronic device 20 generates the additional mapping information 1020 and does not transmit the additional mapping information 1020 to the wearable device 10, the wearable device 10 may obtain the second content by identifying which key the user 101 selects from the input device 103 or by receiving, from the electronic device 20, information about a key selected by the user 101. When the electronic device 20 generates and transmits the additional mapping information 1020 to the wearable device 10 or the wearable device 10 generates the additional mapping information 1020, the wearable device 10 may identify the third content displayed on the display 22 of the electronic device 20, may convert the third content to the first content by using the additional mapping information 1020, and may obtain the second content by converting the first content to the second content, according to the mapping information 1010. Obviously, the wearable device 10 may obtain the second content by obtaining information about a key selected by the user 101.

As described above, when the third content converted according to the additional mapping information 1020 is displayed on the electronic device 20, a nearby person 102 may be confused which content from among the displayed third content and the first content input to the input device 103 by the user 101 is intended to be input by the user 101. Alternatively, the nearby person 102 may determine one of the first content or the third content as content intended to be input by the user 101. Therefore, the wearable device 10 and the electronic device 20 cause confusion to the nearby person 102 by using the additional mapping information 1020, and thus may doubly protect, by using the mapping information 1010 and the additional mapping information 1020, the second content intended to be input by the user 101.

With reference to FIGS. 1 to 10, a method by which the wearable device 10 and the electronic device 20 according to an embodiment of the disclosure enhance security of content by using mapping information with respect to the input device 30 has been described above. Hereinafter, with reference to FIGS. 11 to 14, operations associated with hidden content, the operations being performed by the wearable device 10 and the electronic device 20 according to an embodiment of the disclosure, will now be described.

Figure 11:
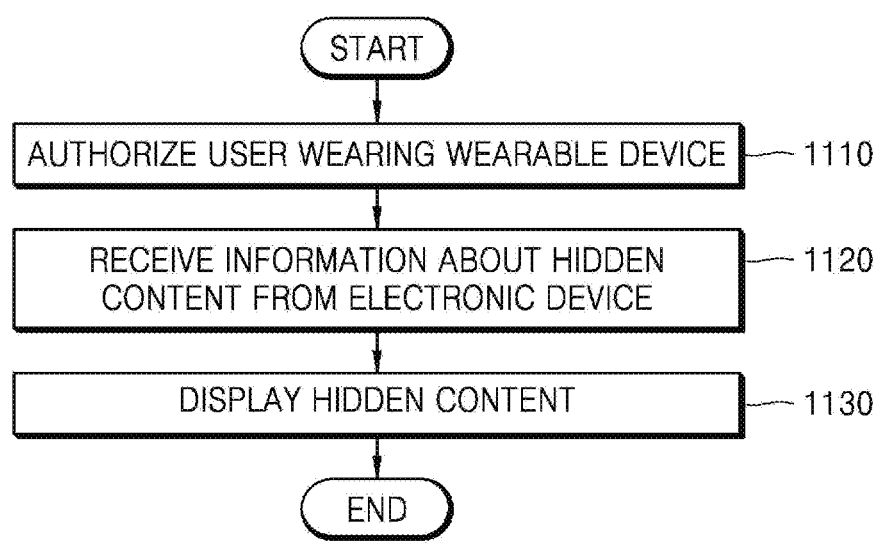
FIG. 11 is a flowchart for describing a method, performed by the wearable device, of displaying hidden content, according to an embodiment of the disclosure.

FIG. 11 is a flowchart for describing a method, performed by the wearable device 10, of displaying hidden content, according to an embodiment of the disclosure.

Referring to FIG. 11, in operation 1110, the wearable device 10 according to an embodiment of the disclosure may authorize a user wearing the wearable device 10. Operation 1100 may correspond to operation 210 of FIG. 2.

In operation 1120, the wearable device 10 according to an embodiment of the disclosure may receive information about hidden content from the electronic device 20.

In the disclosure, the hidden content indicates content that is not displayed on a display of the electronic device 20, the content being from among content stored in the electronic device 20 or content executed or processed in the electronic device 20. The hidden content may be accessed only by using the wearable device 10. For example, the hidden content may be recorded on a memory of the electronic device 20, and the memory having recorded thereon the hidden content may be accessed only by using the wearable device 10. The hidden content is characterized in that the hidden content is not displayed on the electronic device 20 and is accessed only by using the wearable device 10, and except for the characteristic, the hidden content may be similar to another content displayed on the electronic device 20. For example, the hidden content may include an icon, a folder, a file, content of a file, an application, a contact address, conversation content, or the like which is not displayed on the electronic device 20. However, types of content included in the hidden content are not limited to the aforementioned examples and may vary.

Information about the hidden content indicates information necessary for the wearable device 10 to display the hidden content. For example, the information about the hidden content may include at least one of information about a type of the hidden content, information about substance, shape information by which the hidden content is to be displayed, or position information. However, the information about the hidden content is not limited to the aforementioned examples and may vary.

According to an embodiment of the disclosure, when the user is authorized, the wearable device 10 may receive the hidden content from the electronic device 20. The wearable device 10 may request the electronic device 20 for the hidden content, or may receive, from the electronic device 20, information indicating that the hidden content exists in the electronic device 20. The wearable device 10 may transmit, to the electronic device 20, authorization information of the user or information indicating the user wearing the wearable device 10 has authority to access the hidden content. When the user is authorized according to the information received from the wearable device 10, the electronic device 20 may transmit the information about the hidden content to the wearable device 10.

In operation 1130, the wearable device 10 according to an embodiment of the disclosure may display the hidden content. On the display of the wearable device 10, the hidden content may be overlaid on the display of the electronic device 20 or may be displayed on an outer area of the display of the electronic device 20.

The user of the wearable device 10 may identify the hidden content that is not displayed on the electronic device 20 but is displayed on the wearable device 10, and may perform an operation of controlling the hidden content, the operation including selecting or editing of the hidden content. The wearable device 10 and the electronic device 20 may enhance security of the hidden content by allowing the hidden content to be accessed only by using the wearable device 10.

According to an embodiment of the disclosure, operations 1110 and 1130 of FIG. 11 may be performed immediately before or after operations 210 to 240 of FIG. 2 are performed. One of or both operation 210 and operation 1110 may be performed. The user may control the hidden content only via the second key layout or the mapping information described with reference to FIG. 2. The control method will be described in detail with reference to FIG. 12B.

Figure 12A:
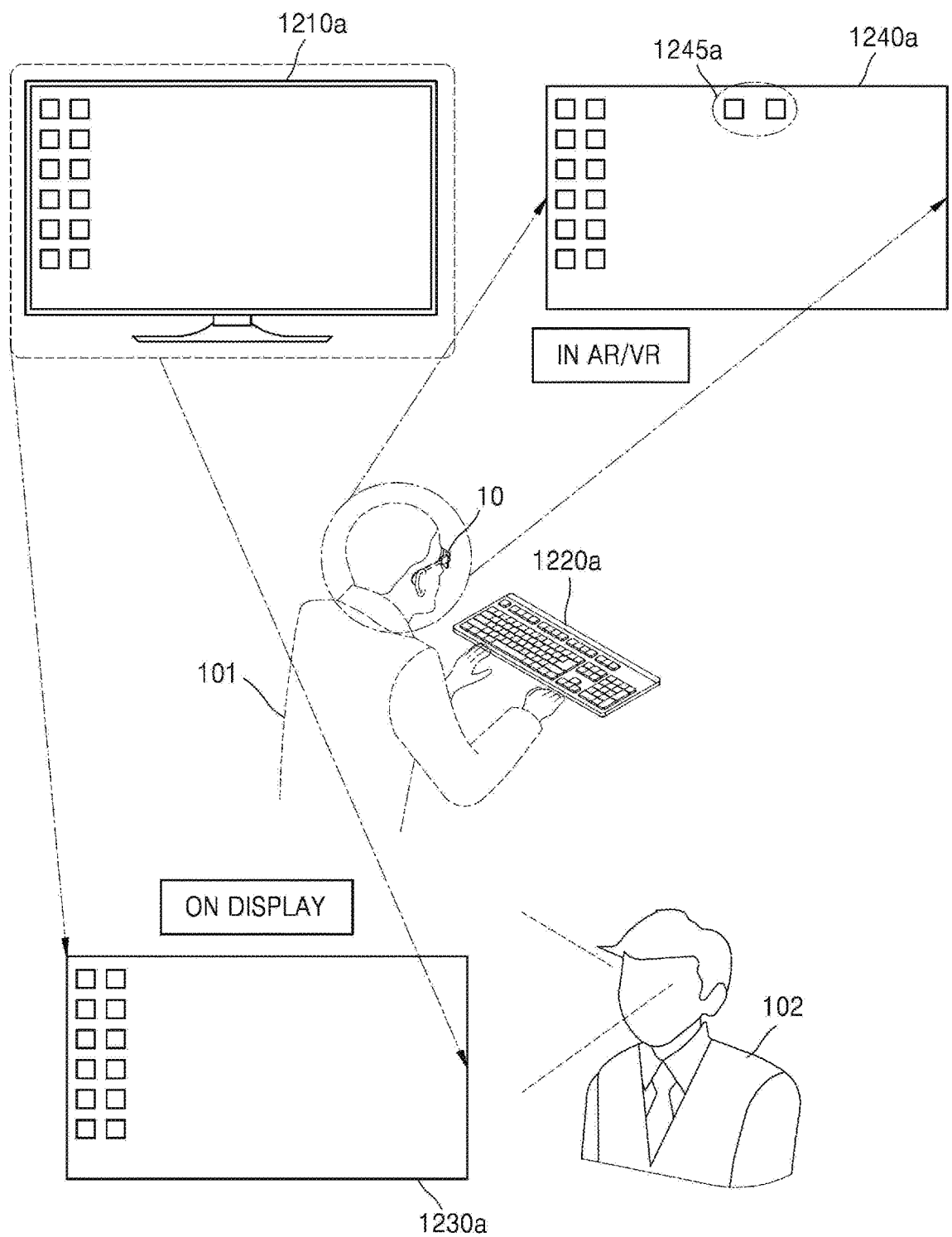
FIG. 12A is a diagram for describing various methods by which the wearable device displays content, according to an embodiment of the disclosure.
Figure 12B:
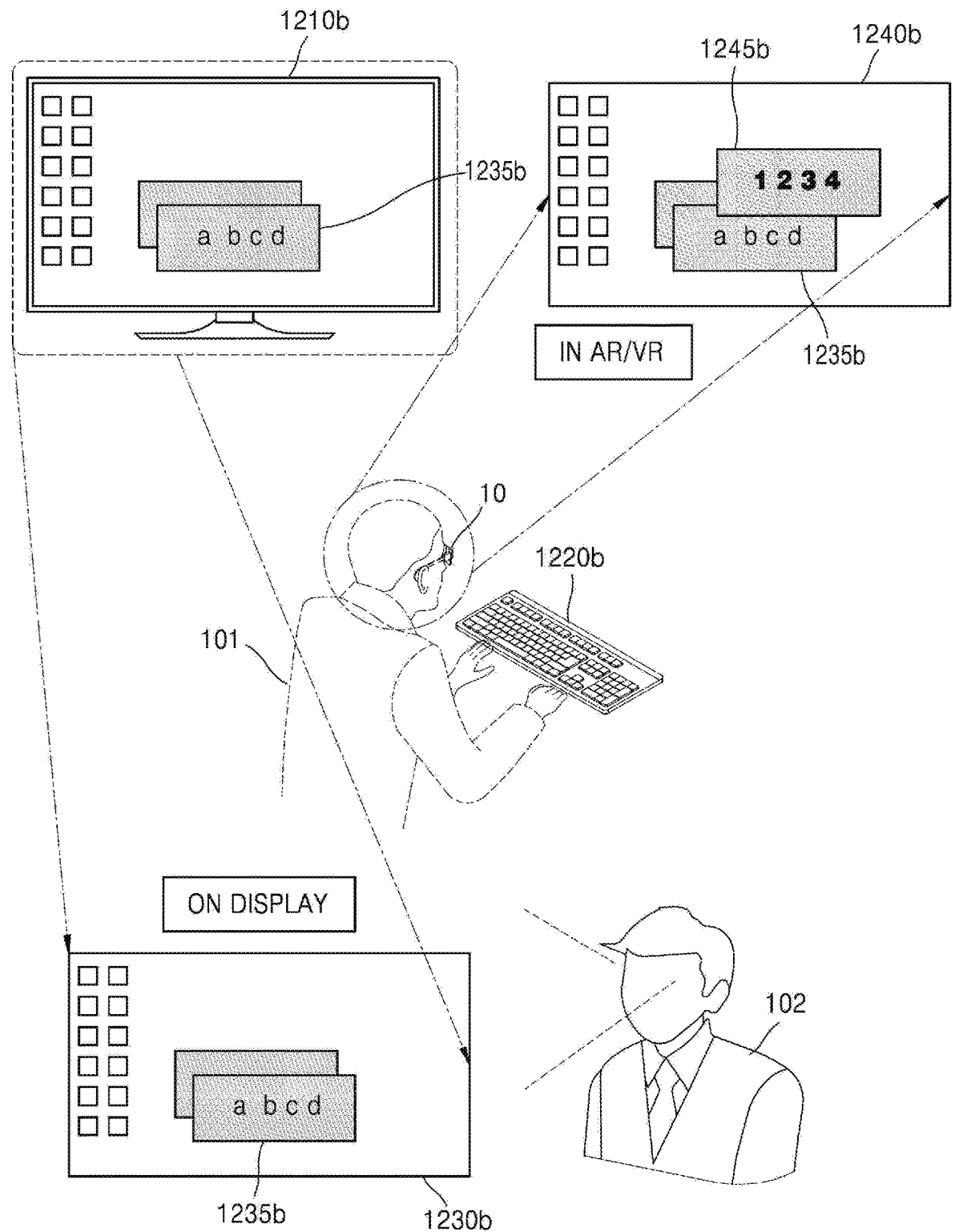
FIG. 12B is a diagram for describing various methods by which the wearable device displays content, according to an embodiment of the disclosure.
Figure 12C:
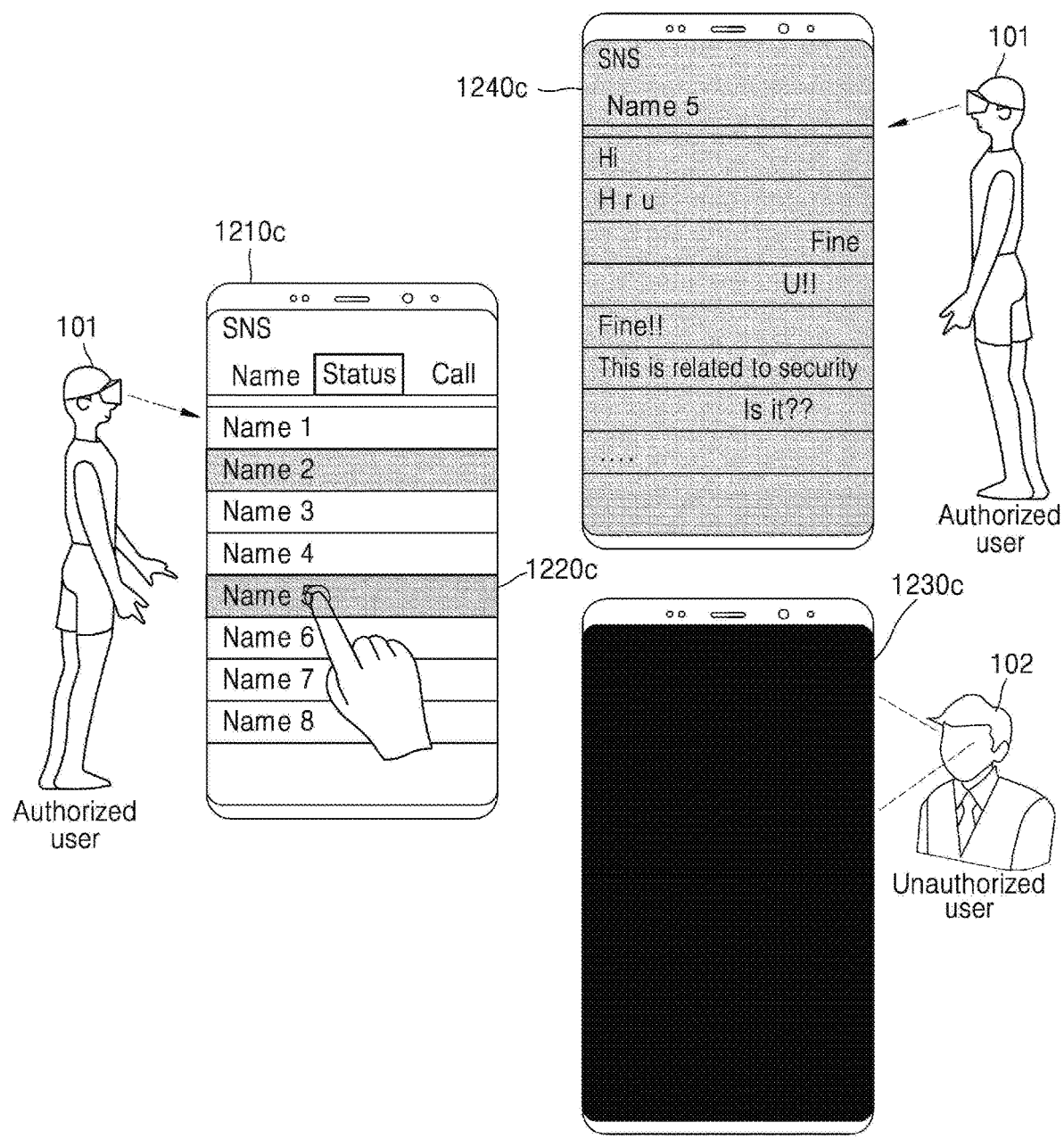
FIG. 12C is a diagram for describing various methods by which the wearable device displays content, according to an embodiment of the disclosure.

FIGS. 12A, 12B and 12C are diagrams for describing various methods of displaying hidden content, the methods being performed by the wearable device 10, according to an embodiment of the disclosure.

Referring to FIG. 12A, a user 101 wears the wearable device 10 and uses an electronic device 1210a by using an input device 1220a. A memory of the electronic device 1210a may have recorded thereon hidden folders 1245a as the hidden content. However, the hidden folders 1245a are not displayed on a display 1230a of the electronic device 1210a. Therefore, a nearby person 102 cannot identify the hidden folders 1245a nor recognize existence of the hidden folders 1245a. However, the hidden folders 1245a may be displayed on a display 1240a of the wearable device 10. Therefore, the user 101 can identify and access the hidden folders 1245a.

According to an embodiment of the disclosure, the hidden content may not be displayed on the electronic device 1210a but may be recorded on the memory of the electronic device 1210a. Therefore, an access to the hidden content may occur, regardless of a display of the hidden content. For example, in a case where the nearby person 102 accidently selects an area corresponding to the hidden folders 1245a on the display 1230a of the electronic device 1210a, the electronic device 1210a may load content of the hidden folders 1245a to the memory. However, as in the hidden folders 1245a, the content of the hidden folders 1245a may not be displayed on the display 1230a of the electronic device 1210a and may be displayed only on the display 1240a of the wearable device 10. That is, even when a random user accesses the hidden content, the electronic device 1210a may not display content associated with the hidden content. Alternatively, when a random user accesses the hidden content, the electronic device 1210a may display, by using black or white marking, an area of content associated with the hidden content, thereby preventing the content from being identified by the random user.

According to an embodiment of the disclosure, the hidden content may have been recorded on the memory of the electronic device 1210a and may be activated in response to communication connection between the electronic device 1210a and the wearable device 10. Also, the hidden content may be activated in response to authorization of the wearable device 10 or the user of the wearable device 10.

Before the activation, when the hidden content is in an inactive state, it may not be possible to access the hidden content. For example, before the electronic device 1210a identifies the wearable device 10 and is connected for communication with the wearable device 10, the user 101 or the nearby person 102 cannot access the hidden content. For example, even when the area corresponding to the hidden folders 1245a is selected from the electronic device 1210a, content of the hidden folders 1245a may not be loaded to the memory. When the electronic device 1210a is connected for communication with the wearable device 10 or authorizes the wearable device 10 or the user of the wearable device 10, the hidden content may be activated and may become accessible.

Referring to FIG. 12B, a user 101 wears the wearable device 10 and uses an electronic device 1210b by using an input device 1220b. An open window 1235b and a hidden window 1245b are being executed in the electronic device 1210b, and the user 101 may input content to the hidden window 1245b by using the input device 1220b. However, the hidden window 1245b is not displayed on a display

1230*b* of the electronic device 1210*b*. Therefore, a nearby person 102 can identify only the open window 1235*b*, and cannot identify the hidden window 1245*b* nor recognize existence of the hidden window 1245*b*. Also, the nearby person 102 only can identify that the user 101 uses the input device 1220*b*, and cannot identify an input of content to the hidden window 1245*b*. However, the hidden window 1245*b* may be displayed on a display 1240*b* of the wearable device 10. Therefore, the user 101 may identify the hidden window 1245*b* and may input content to the hidden window 1245*b*.

According to an embodiment of the disclosure, the electronic device 1210*b* can access hidden content only by using the mapping information or the second key layout described with reference to FIG. 2. For example, an access to the hidden content may be protected using a password. The password may be encrypted by using the mapping information described with reference to FIG. 2. That is, when the password is '1234', it is possible to access the hidden content only when not '1234' but a character string to which '1234' is mapped according to the mapping information is input by using the input device 1220*b*. Therefore, even when the nearby person 102 knows the password, only the user 101 wearing the wearable device 10 may access the hidden content by inputting a correct password by using the second key layout displayed on the wearable device 10 and the input device 1220*b*. As described above, according to a feature in which the hidden content is not displayed on the electronic device 1210*b* and a feature in which a password is encrypted using the mapping information, the hidden content may be doubly protected.

Referring to FIG. 12C, an electronic device 1210*c* according to an embodiment of the disclosure may be a mobile device, and may display a list of social networking service (SNS) friends of a user 101. However, in the list, 'Name 2' and 'Name 5' 1220*c* are hidden content, and thus, may not be displayed on the electronic device 1210*c* and may not be seen to a nearby person 102. The user 101 wearing the wearable device 10 may identify hidden content and thus may select 'Name 5' 1220*c* from the list. In response to selection of 'Name 5' 1220*c*, the electronic device 1210*c* may load, to a memory, information about a history 1240*c* of messages exchanged with a friend of 'Name 5' 1220*c*. However, the electronic device 1210*c* may not display the information about the history 1240*c* of messages exchanged with the friend of 'Name 5' 1220*c* on the electronic device 1210*c* but may transmit, as hidden content, the information to the wearable device 10. The electronic device 1210*c* may display a black window 1230*c*, thereby preventing the nearby person 102 from seeing the history 1240*c* of messages exchanged between the user 101 and the friend of 'Name 5' 1220*c*. The wearable device 10 may display the history 1240*c* of messages exchanged with the friend of 'Name 5' 1220*c*, based on the information received from the electronic device 1210*c*.

Figure 13:
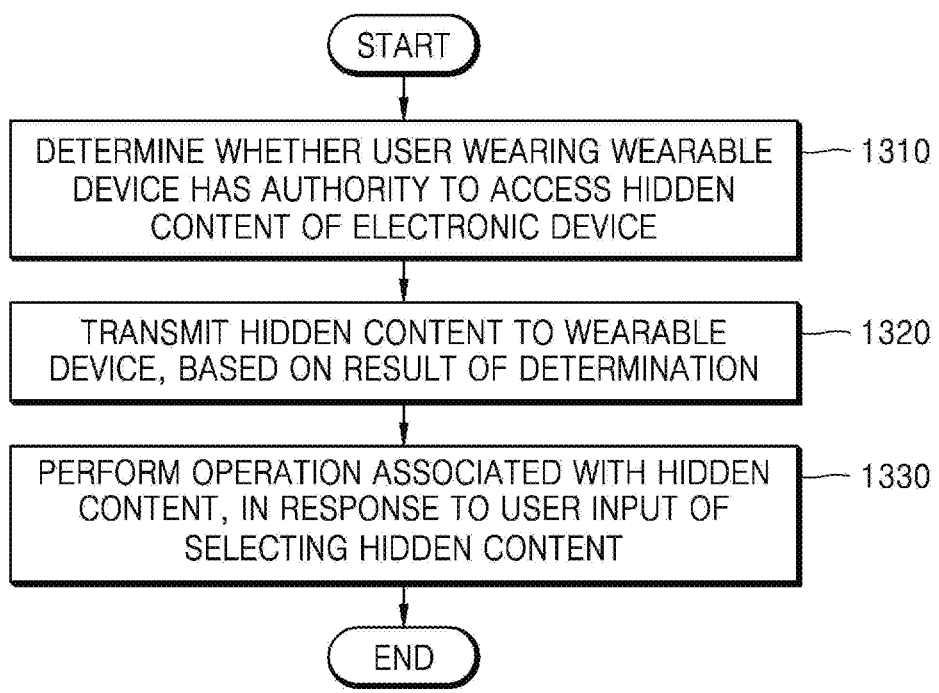
FIG. 13 is a diagram for describing a method, performed by the electronic device, of performing an operation associated with hidden content, according to an embodiment of the disclosure.

FIG. 13 is a diagram for describing a method, performed by the electronic device 20, of performing an operation associated with hidden content, according to an embodiment of the disclosure.

Referring to FIG. 13, in operation 1310, the electronic device 20 according to an embodiment of the disclosure may determine whether a user wearing the wearable device 10 has authority to access hidden content of the electronic device 20.

According to an embodiment of the disclosure, the electronic device 20 may store a list of users having authority to access the hidden content or a list of authorization information of wearable devices in an internal memory of the electronic device 20. Alternatively, the electronic device 20 may receive, from an external server, the list of users having authority to access the hidden content of the electronic device 20 or the list of authorization information of wearable devices. The electronic device 20 may receive, from the wearable device 10, authorization information of the wearable device 10 or authorization information about the user wearing the wearable device 10. The electronic device 20 may identify whether the authorization information received from the wearable device 10 matches with the authorization information stored in the electronic device 20 or received from the external server, and thus may determine user's authority to access the hidden content.

In operation 1320, the electronic device 20 according to an embodiment of the disclosure may transmit the hidden content to the wearable device 10, based on a result of the determination. That is, when the wearable device 10 or the user of the wearable device 10 is authorized, the electronic device 20 may transmit the hidden content to the wearable device 10. Also, the electronic device 20 may transmit information to the wearable device 10, the information being related to the hidden content and required for the hidden content to be displayed on the wearable device 10.

In operation 1330, the electronic device 20 according to an embodiment of the disclosure may perform an operation associated with the hidden content, in response to a user input of selecting the hidden content.

According to an embodiment of the disclosure, the operation associated with the hidden content may include various operations performed using the hidden content. For example, the operation associated with the hidden content may include at least one of an operation of inputting content to the hidden content, an operation of loading content associated with the hidden content, or an operation of performing a preset process corresponding to the hidden content. For example, when the user input of selecting the hidden content is an input for triggering a preset process in the electronic device 20, the electronic device 20 may perform the preset process corresponding to the hidden content.

Figure 14:
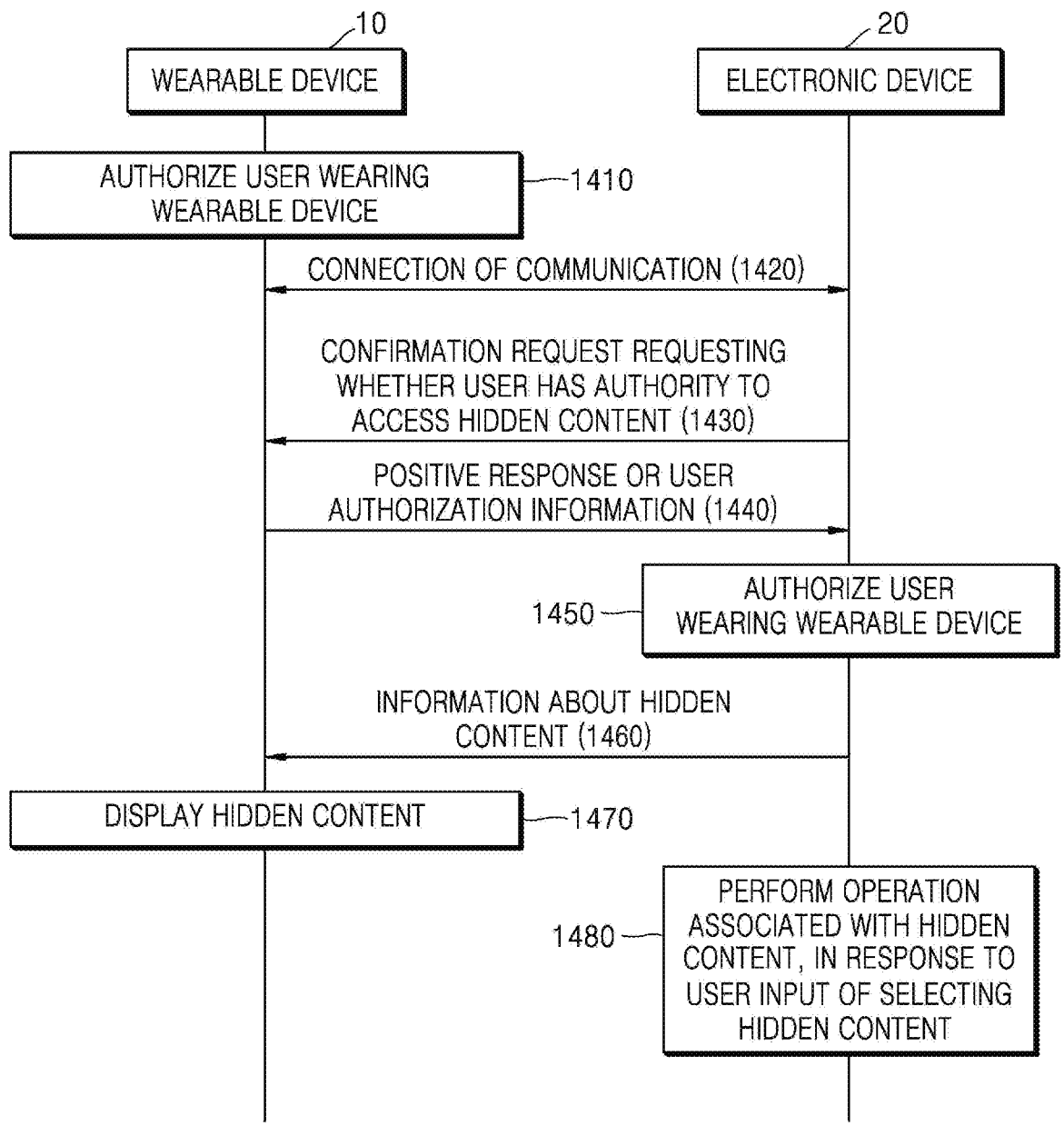
FIG. 14 is a flowchart for describing operations associated with hidden content, the operations being performed by the electronic device and the wearable device, according to an embodiment of the disclosure.

FIG. 14 is a flowchart for describing operations associated with hidden content, the operations being performed by the electronic device 20 and the wearable device 10, according to an embodiment of the disclosure.

Referring to FIG. 14, in operation 1410, the wearable device 10 according to an embodiment of the disclosure may authorize a user wearing the wearable device 10.

In operation 1420, the wearable device 10 according to an embodiment of the disclosure may be connected for communication with the electronic device 20. To prevent a security attack via an external server or a network, the wearable device 10 may be connected for communication with the electronic device 20 by using a direct communication scheme.

In operation 1430, the electronic device 20 according to an embodiment of the disclosure may transmit, to the wearable device 10, a confirmation request requesting whether a user has authority to access hidden content.

According to an embodiment of the disclosure, the electronic device 20 may authorize the user by receiving, from the wearable device 10, a message indicating that the user of the wearable device 10 has authority to access hidden content. For example, the electronic device 20 may transmit, to the wearable device 10, a confirmation request requesting whether the user of the wearable device 10 has authority to access hidden content. When the electronic device 20 receives a positive response from the wearable device 10, the electronic device 20 may determine that the user has access authority.

In operation 1440, in response to the confirmation request received from the electronic device 20, the wearable device 10 according to an embodiment of the disclosure may transmit the positive response or user authorization information to the electronic device 20.

In operation 1450, the electronic device 20 according to an embodiment of the disclosure may authorize the user wearing the wearable device 10, according to the positive response or the user authorization information received from the wearable device 10.

In operation 1460, when the user is authorized, the electronic device 20 according to an embodiment of the disclosure may transmit hidden content information 1460 to the wearable device 10.

In operation 1470, the wearable device 10 according to an embodiment of the disclosure may display the hidden content.

In operation 1480, the wearable device 10 according to an embodiment of the disclosure may perform an operation associated with the hidden content, in response to a user input of selecting the hidden content.

Operations 1410 and 1470 of FIG. 14 may respectively correspond to operations 1110 and 1130 of FIG. 11. Operations 1460 and 1480 of FIG. 14 may respectively correspond to operations 1320 and 1330 of FIG. 13. Therefore, descriptions of operations of FIG. 14 which correspond to those of FIG. 11 or 13 are not provided here.

The second key layout and the method of displaying content according to various embodiments of the disclosure are described above in terms of operations. Hereinafter, with reference to FIGS. 15 to 19, the second key layout and the method of displaying content according to various embodiments of the disclosure will now be described in terms of device.

Figure 15:
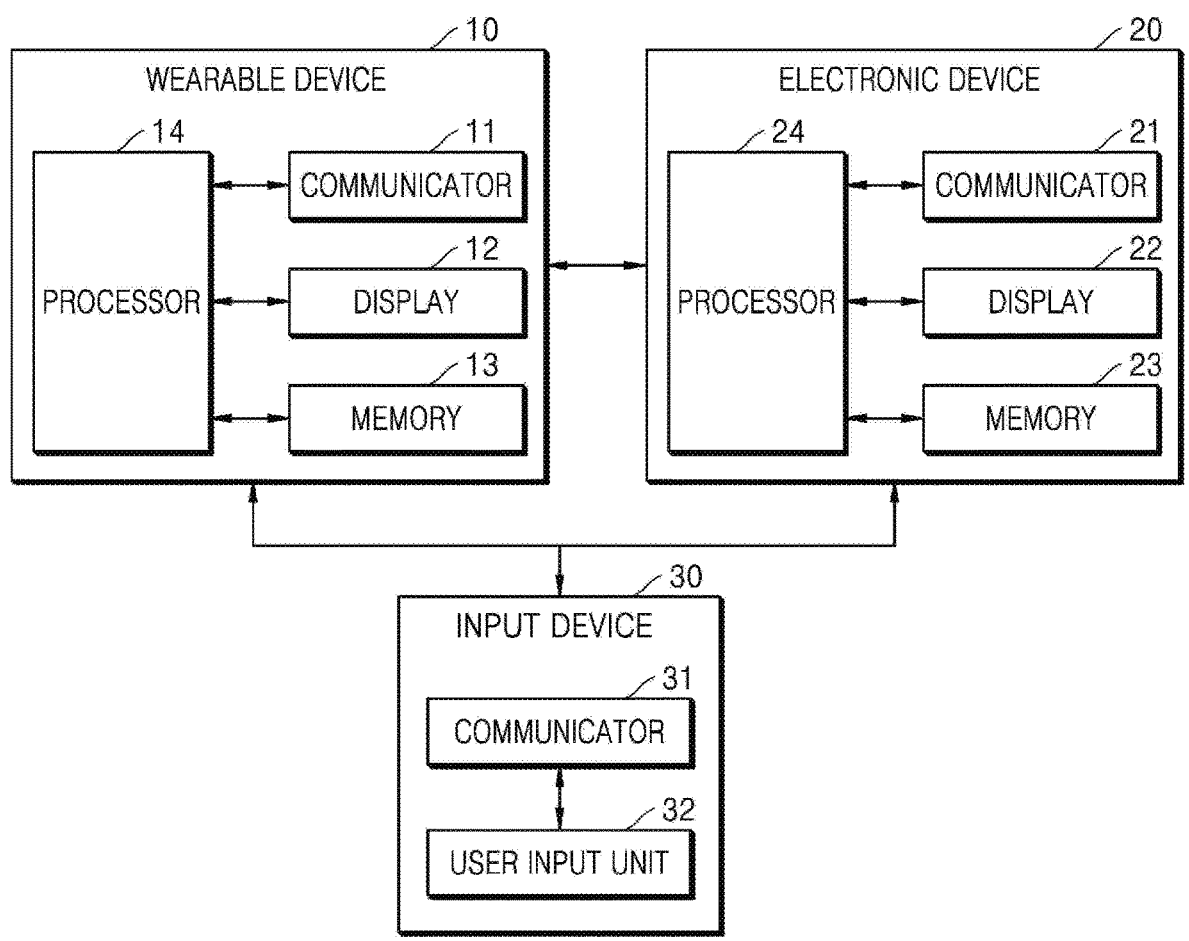
FIG. 15 is a block diagram of the wearable device, the electronic device, and the input device, according to an embodiment of the disclosure.

FIG. 15 is a block diagram of the wearable device 10, the electronic device 20, and the input device 30, according to an embodiment of the disclosure. Referring to FIG. 15, the wearable device 10, the electronic device 20, and the input device 30 may exchange data with each other.

The wearable device 10 according to an embodiment of the disclosure may include a communicator 11 (e.g., a transceiver), a display 12, a memory 13, and a processor 14. However, components of the wearable device 10 are not limited to the aforementioned examples. For example, the wearable device 10 may include more components than the aforementioned components or may include fewer components than the aforementioned components. Also, the communicator 11, the memory 13, and the processor 14 may be embodied as one chip.

According to an embodiment of the disclosure, the communicator 11 may include one or more components for communication with the electronic device 20 and the input device 30. For example, the communicator 11 may include at least one of a short-range communication module, a wired communication module, or a wireless communication module. The short-range communication module may use various short-range communication technologies, e.g., Bluetooth, radio frequency identification (RFID), infrared Data Association (IrDA), Ultra Wideband (UWB), ZigBee, or the like. Also, the wireless communication module may use various wireless communication technologies, for example, a direct communication technology such as a device-to-device (D2D) communication technology. For example, the wireless communication module may use the D2D communication technology according to the $3^{rd}$ Generation Partnership Project (3GPP) standard, the Long-Term Evolution (LTE) standard, or the New Radio (NR) standard. When the communicator 11 communicates with the electronic device 20 by using the short-range communication scheme or the direct communication scheme, it may be safer, in terms of security, than communication using an external server or a network.

The communicator 11 may exchange various types of information with the electronic device 20. For example, the communicator 11 may transmit, to the electronic device 20, user authorization information, mapping information in which at least one key in a first key layout of the input device 30 is mapped to a different key, second key layout information in which the first key layout is converted according to the mapping information, information about second content converted from first content according to the mapping information, or the like. The communicator 11 may receive, from the electronic device 20, information about the input device 30, information about the first content input by a user, information about hidden content, or the like.

The communicator 11 may exchange various types of information with the input device 30. For example, the communicator 11 may receive, from the input device 30, identification information of the input device 30, key layout information, information about a key input by a user, or the like. The communicator 11 may transmit a message requesting the aforementioned information to the wearable device 30.

The display 12 according to an embodiment of the disclosure may display, by the control of the processor 14, content input via the communicator 11 or content generated by the processor 14. The display 12 may be embodied as various physical configurations. For example, the display 12 may be embodied as a plasma display panel (PDP), a liquid-crystal display (LCD), an organic light-emitting diode (OLED) display, a flexible display, and the like, or may be embodied as a three-dimensional (3D) display. Also, the display 12 may be embodied as a transparent display. Also, the display 12 may be configured as a touchscreen to function as an input device.

The display 12 may display, by the control of the processor 14, mapping information in which at least one key in a first key layout of the input device 30 is mapped to a different key, second key layout information in which the first key layout is converted according to the mapping information, second content converted from first content according to the mapping information, or the like.

The memory 13 according to an embodiment of the disclosure stores data processed by components of the wearable device 10. The memory 13 stores a plurality of instructions executable by the processor 14. The memory 13 may include a volatile memory and a non-volatile memory.

The volatile memory indicates a computer memory requesting electricity to maintain information stored therein, and includes a general-purpose random access memory (RAM) such as a dynamic RAM (DRAM), a static RAM (SRAM), and the like. The volatile memory may store working data, according to a Suspend-to-RAM function. When at least one application is executed by the processor 14, the volatile memory may store code of the executed application and data processed or to be processed by the application. The code of the application and the data processed by the application may be referred to as application execution data.

The non-volatile memory (NVM or NVRAM) indicates a computer memory maintaining stored information without a supply of power, and may be implemented as a read-only memory (ROM), a flash memory, a hard disk, an optical disc, erasable programmable ROM (EPROM), electrically erasable programmable ROM (EEPROM), or the like. The NVM may store execution state information about the application corresponding to the application execution data stored in the volatile memory. Also, according to some embodiments of the disclosure, the memory 13 may be regarded as a non-transitory storage medium. The term "non-transitory" may indicate that the storage medium is not embodied in a carrier wave or a propagated signal. However, the term "non-transitory" should not be interpreted to mean that the memory 13 is non-movable.

The memory 13 may store various types of information. For example, the memory 13 may store mapping information in which at least one key in a first key layout of the input device 30 is mapped to a different key, second key layout information in which the first key layout is converted according to the mapping information, information about second content converted from first content according to the mapping information, or the like. Also, the memory 13 may store information about the input device 30, information about the first content input by a user, information about hidden content, or the like.

The processor 14 is configured to control all operations of the wearable device 10 and a signal flow between inner components of the wearable device 10, and process data. The processor 14 may execute a plurality of instructions or various applications stored in the memory 13. The processor 14 may be configured as one or more processors. For example, the processor 14 may be configured as a single-core processor or a multi-core processor.

According to an embodiment of the disclosure, the processor 14 may authorize a user wearing the wearable device 10, may identify a first key layout of the input device 30 connected to the electronic device 20 used by the authorized user, may generate mapping information in which at least one key in the first key layout is mapped to a different key, may control the display 12 to display a second key layout in which the first key layout is mapped according to the mapping information, may determine second content as content input by the authorized user, based on the second key layout and an input by the authorized user with respect to the input device 30, and may control the display 12 to display the second content. The second content and first content are mapped to each other, the first content being determined based on the first key layout and an input by the authorized user with respect to the input device 30.

According to an embodiment of the disclosure, the processor 14 may obtain information about a key selected from the input device 30 by the authorized user, may determine a key mapped to the selected key, according to the mapping information, and may determine the mapped key as content input by the authorized user.

According to an embodiment of the disclosure, the processor 14 may control the communicator 11 to transmit the mapping information or the second content to the electronic device 20. The mapping information may be used by the electronic device 20 to convert the first content to the second content, and the second content may be used, as the content input by the authorized user, by the electronic device 20.

According to an embodiment of the disclosure, the processor 14 may generate additional mapping information in which at least one key in the first key layout is mapped to a different key, and may control the communicator 11 to transmit the additional mapping information to the electronic device 20. The additional mapping information may be used when the first content is converted to third content before the third content is displayed on the display 22 of the electronic device 20.

According to an embodiment of the disclosure, the processor 14 may control the communicator 11 to receive information about hidden content from the electronic device 20, and based on determination that the user wearing the wearable device 10 is the authorized user, the processor 14 may control the display 12 to display the hidden content. The hidden content may denote content that is not displayed on the display 22 of the electronic device 20, the content being from among content stored in the electronic device 20 or content executed in the electronic device 20.

According to an embodiment of the disclosure, the processor 14 may control the communicator 11 to receive, from the electronic device 20, a confirmation request requesting whether the user wearing the wearable device 10 has authority to access the hidden content, transmit a response message including at least one of positive response information or user authorization information about the authorized user to the electronic device 20, based on determination that the user wearing the wearable device 10 is the authorized user, and receive information about the hidden content from the electronic device 20, in response to the response message.

The electronic device 20 according to an embodiment of the disclosure may include a communicator 21 (e.g., a transceiver), a display 22, a memory 23, and a processor 24. However, components of the electronic device 20 are not limited to the aforementioned examples. For example, the electronic device 20 may include more components than the aforementioned components or may include fewer components than the aforementioned components. Also, the communicator 21, the memory 23, and the processor 24 may be embodied as one chip.

According to an embodiment of the disclosure, the communicator 21 may include one or more components for communication with the wearable device 10 and the input device 30. For example, the communicator 21 may include at least one of a short-range communication module, a wired communication module, or a wireless communication module. The short-range communication module may use various short-range communication technologies, e.g., Bluetooth, RFID, IrDA, UWB, ZigBee, or the like. Also, the wireless communication module may use various wireless communication technologies, for example, a direct communication technology such as a D2D communication technology. For example, the wireless communication module may use the D2D communication technology according to the 3GPP standard, the LTE standard, or the NR standard. When the communicator 21 communicates with the wearable device 10 by using the short-range communication scheme or the direct communication scheme, it may be safer, in terms of security, than communication using an external server or a network.

The communicator 21 may exchange various types of information with the wearable device 10. For example, the communicator 21 may transmit, to the wearable device 10, information about the input device 30, information about first content input by a user, information about hidden content, or the like. The communicator 21 may receive, from the wearable device 10, user authorization information, mapping information in which at least one key in a first key layout of the input device 30 is mapped to a different key, second key layout information in which the first key layout is converted according to the mapping information, information about second content converted from first content according to the mapping information, or the like.

The communicator 21 may exchange various types of information with the input device 30. For example, the communicator 21 may receive, from the input device 30, identification information of the input device 30, key layout information, information about a key input by a user, or the like. The communicator 21 may transmit a message requesting the aforementioned information to the wearable device 30.

The display 22 according to an embodiment of the disclosure may display, by the control of the processor 24, content input via the communicator 21 or content generated by the processor 24. The display 22 may be embodied as various physical configurations. For example, the display 22 may be embodied as a PDP, a LCD, an OLED display, a flexible display, and the like, or may be embodied as a 3D display. Also, the display 22 may be embodied as a transparent display. Also, the display 22 may be configured as a touchscreen to function as an input device. The display 22 may display, by the control of the processor 24, content the user inputs by using the input device 30 or the like.

The memory 23 according to an embodiment of the disclosure stores data processed by components of the electronic device 20. The memory 23 stores a plurality of instructions executable by the processor 24. The memory 23 may include a volatile memory and an NVM.

The volatile memory indicates a computer memory requesting electricity to maintain information stored therein, and includes a general-purpose RAM such as a DRAM, a SRAM, and the like. The volatile memory may store working data, according to a Suspend-to-RAM function. When at least one application is executed by the processor 24, the volatile memory may store code of the executed application and data processed or to be processed by the application. The code of the application and the data processed by the application may be referred to as application execution data.

The NVM or NVRAM indicates a computer memory maintaining stored information without a supply of power, and may be implemented as a ROM, a flash memory, a hard disk, an optical disc, EPROM, EEPROM, or the like. The NVM may store execution state information about the application corresponding to the application execution data stored in the volatile memory. Also, according to some embodiments of the disclosure, the memory 23 may be regarded as a non-transitory storage medium. The term "non-transitory" may indicate that the storage medium is not embodied in a carrier wave or a propagated signal. However, the term "non-transitory" should not be interpreted to mean that the memory 23 is non-movable.

The memory 23 may store various types of information. For example, the memory 23 may store mapping information in which at least one key in a first key layout of the input device 30 is mapped to a different key, second key layout information in which the first key layout is converted according to the mapping information, information about second content converted from first content according to the mapping information, or the like. Also, the memory 23 may store information about the input device 30, information about the first content input by a user, information about hidden content, or the like.

The processor 24 is configured to control all operations of the electronic device 20 and a signal flow between inner components of the electronic device 20, and process data. The processor 24 may execute a plurality of instructions or various applications stored in the memory 23. The processor 24 may be configured as one or more processors. For example, the processor 24 may be configured as a single-core processor or a multi-core processor.

According to an embodiment of the disclosure, the processor 24 may control the communicator 21 to receive, from the wearable device 10, mapping information in which at least one key in a first key layout of the input device 30 connected to the electronic device 20 is mapped to a different key, and obtain first content input by the user by using the input device 30, may convert the first content to second content, according to the mapping information, and may perform an operation associated with the second content. The operation associated with the second content may include at least one of an operation of storing the second content, an operation of transmitting the second content to an external device, an operation of authorizing a secure session by using the second content, or an operation of performing a preset process corresponding to the second content.

According to an embodiment of the disclosure, the first content may be obtained based on the first key layout and a user input with respect to the input device 30, and the processor 24 may control the display 22 to display the first content.

According to an embodiment of the disclosure, the processor 24 may control the communicator 21 to receive, from the wearable device 10, additional mapping information in which at least one key in the first key layout is mapped to a different key, may convert the first content to third content according to the additional mapping information, and may control the display 22 to display the third content.

According to an embodiment of the disclosure, the processor 24 may determine whether the user wearing the wearable device 10 has authority to access hidden content of the electronic device 20, may control the communicator 21 to transmit the hidden content to the wearable device 10, based on a result of the determination, and may perform an operation associated with the hidden content, based on a user input of selecting the hidden content. The hidden content may denote content that is not displayed on the display 22 of the electronic device 20, the content being from among content stored in the electronic device 20 or content executed in the electronic device 20.

The input device 30 according to an embodiment of the disclosure may include a communicator 31 (e.g., a transceiver) and a user input unit 32. However, components of the input device 30 are not limited to the aforementioned examples. For example, the input device 30 may include more components than the aforementioned components or may include fewer components than the aforementioned components. Also, the communicator 31 and the user input unit 32 may be embodied as one chip.

The input device 30 may be connected to the electronic device 20 in a wired or wireless manner. Also, the input device 30 may be hardware included in the electronic device 20. Alternatively, even though FIG. 15 illustrates a block diagram of the input device 30, the input device 30 may not be a hardware configuration and may be a user interface module provided by the electronic device 20 via the display 22. For example, the input device 30 may be an input user interface module including a touch interface. The input device 30 may be implemented as one of various hardware configurations or software modules for receiving an input from a user and transmitting the input to the electronic device 20.

The communicator 31 according to an embodiment of the disclosure may exchange various types of information with the input device 10 or the electronic device 20. For example, the communicator 31 may transmit identification information of the input device 30, key layout information, information about a key input by a user, or the like to the input device 10 or the electronic device 20. The communicator 31 may receive a message requesting the aforementioned information from the input device 10 or the electronic device 20.

The user input unit 32 according to an embodiment of the disclosure may receive an input from the user according to various schemes. The user input unit 32 may include a plurality of selection items (e.g., keys) that are selectable by the user. The user input unit 32 may be implemented as various hardware configurations including a physical keyboard or a keypad which includes the plurality of selection items. Alternatively, the user input unit 32 may be implemented as various hardware modules including the plurality of selection items. For example, the user input unit 32 may be an input user interface including a touch interface, or an input user interface optically providing the plurality of selection items via a beam projector or the like.

Figure 16:
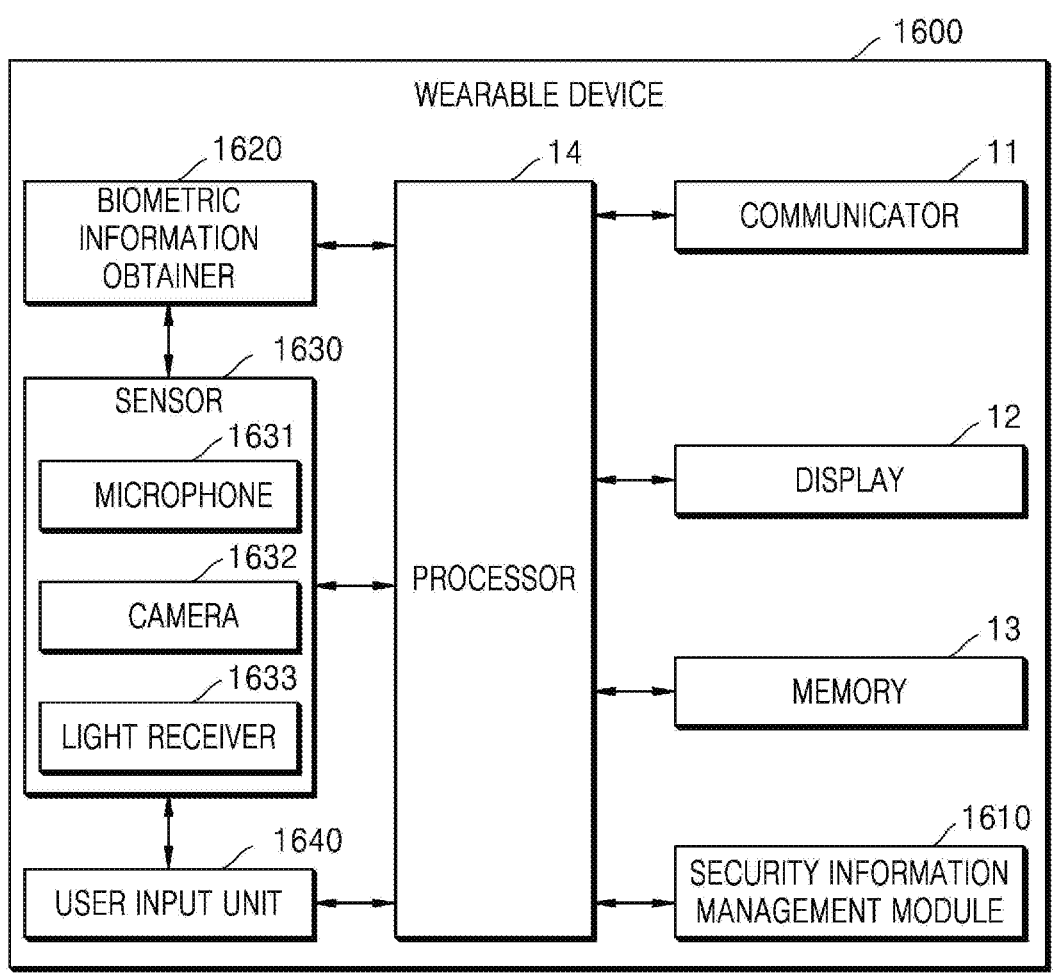
FIG. 16 is a block diagram for describing an inner configuration of a wearable device, according to an embodiment of the disclosure.

FIG. 16 is a block diagram for describing an inner configuration of a wearable device 1600, according to an embodiment of the disclosure.

Referring to FIG. 16, the wearable device 1600 according to an embodiment of the disclosure may include the communicator 11, the display 12, the memory 13, the processor 14, a security information management module 1610, a biometric information obtainer 1620, a sensor 1630, and a user input unit 1640. The wearable device 1600 of FIG. 16 corresponds to an example of an inner configuration of the wearable device 10 shown in FIG. 15. The communicator 11, the display 12, the memory 13, and the processor 14 are described above with reference to FIG. 15, and thus detailed descriptions thereof are not provided here.

The security information management module 1610 may generate or manage user authorization information, mapping information in which at least one key in a first key layout of the input device 30 is mapped to a different key, second key layout information in which the first key layout is converted according to the mapping information, information about second content converted from first content according to the mapping information, or the like. The security information management module 1610 will be described in detail with reference to FIG. 17.

The biometric information obtainer 1620 may obtain, by the control of the processor 14, biometric information from a user so as to authorize the user. The biometric information of the user may include at least one of iris data, fingerprint data, voice pattern information (or, voice fingerprint data), or facial data of the user, but is not limited thereto and thus may include various types of biometric information. The biometric information obtainer 1620 may obtain, from the sensor 1630, a signal sensed by the sensor 1630 so as to obtain the biometric information of the user.

The sensor 1630 may include a microphone 1631, a camera 1632, and a light receiver 1633. The sensor 1630 may sense adjacent things including a user, the electronic device 20, the input device 30, or the like around the wearable device 1600. For example, the sensor 1630 may sense a voice of the user via the microphone 1631, biometric information of the user via the camera 1632, content displayed on the display 22 of the electronic device 20, the input device 30, or the like. Also, the sensor 1630 may obtain and transmit the biometric information of the user to the biometric information obtainer 1620, and may sense and transmit information about a user input to the user input unit 1640. However, components of the sensor 1630 are not limited to the aforementioned examples. For example, the sensor 1630 may include more components than the afore-mentioned components or may include fewer components than the aforementioned components.

The user input unit 1640 may receive a user input to control the wearable device 1600. The user input unit 1640 may provide an input user interface to the user. The input user interface may be implemented in various manners. For example, the input user interface may be implemented as a physical button, a touchable component on the display 12, a voice recognition interface, or the like. The user input unit 1640 may receive an input by the user via the signal sensed by the sensor 1630.

Figure 17:
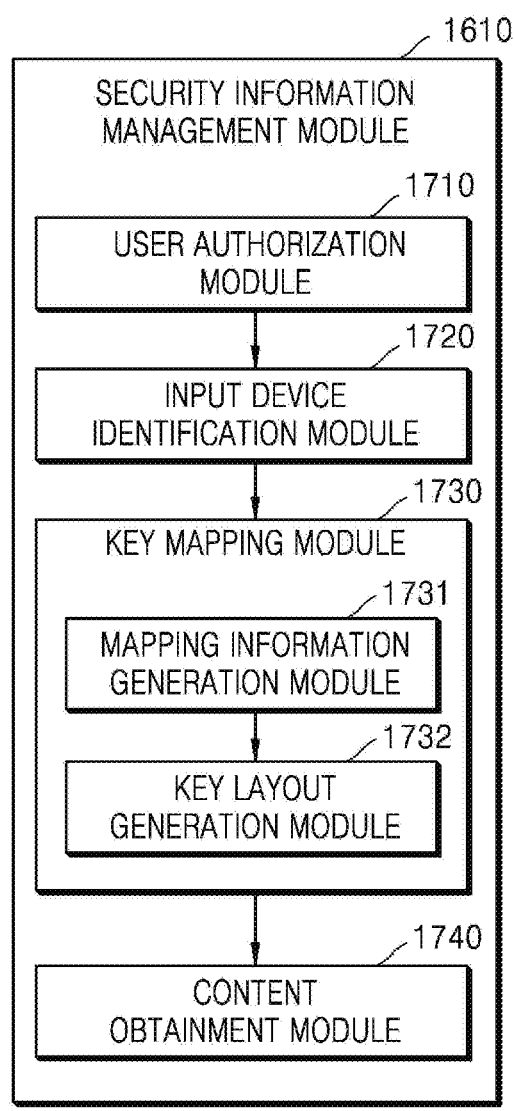
FIG. 17 is a block diagram for describing a security information management module of the wearable device, according to an embodiment of the disclosure.

FIG. 17 is a block diagram for describing a security information management module 1610 of the wearable device 1600, according to an embodiment of the disclosure.

Referring to FIG. 17, the security information management module 1610 may include a user authorization module 1710, an input device identification module 1720, a key mapping module 1730, and a content obtainment module 1740. The security information management module 1610 may be a group of a plurality of instructions stored in the memory 13 and executed by the processor 14. Alternatively, the security information management module 1610 may be a hardware configuration to perform a function of managing security information in the processor 14. Alternatively, the security information management module 1610 may be a special-purpose processor or a software module existing in the wearable device 1600, separately from the memory 13 or the processor 14.

The user authorization module 1710 may authorize whether a user of the wearable device 1600 is a user who is authorized to access security information. For example, the user authorization module 1710 may authorize the user by comparing identification information of the user which is stored in the memory 13 of the wearable device 1600 with information of the user wearing the wearable device 1600. Also, the user authorization module 1710 may newly obtain identification information of the user and may store the identification information in the memory 13.

The input device identification module 1720 may identify the first key layout of the input device 30 connected to the electronic device 20 the user uses. The input device identification module 1720 may identify the first key layout by identifying the input device 30 via the sensor 1630, and may receive information about the input device 30 or information about the first key layout from the electronic device 20 or the input device 30.

The key mapping module 1730 may include a mapping information generation module 1731 and a key layout generation module 1732. The mapping information generation module 1731 may generate mapping information in which at least one key in the first key layout is mapped to a different key. The key mapping module 1730 may map at least one key in the first key layout to a different key, according to various mapping schemes. For example, the key mapping module 1730 may map transpose the order of keys in the first key layout or may randomly map at least one key to a different key. Also, the key mapping module 1730 may generate a random function for changing an arrangement or the order of elements in a preset group, and may apply the random function to the first key layout, thereby generating the mapping information. The key layout generation module 1732 may convert the first key layout to a second key layout, according to the mapping information generated by the mapping information generation module 1731. The mapping information or the second key layout may be displayed on the display 12, by the control of the processor 14. The user may input content to the electronic device 20 by using the input device 30, based on the displayed mapping information or the displayed second key layout.

The content obtainment module 1740 may obtain the first content input by the user by using the input device 30. Also, the content obtainment module 1740 may obtain the second content by converting the first content according to the mapping information. Also, the content obtainment module 1740 may obtain hidden content from the electronic device 20. The second content or the hidden content may be displayed on the display 12, by the control of the processor 14.

Figure 18:
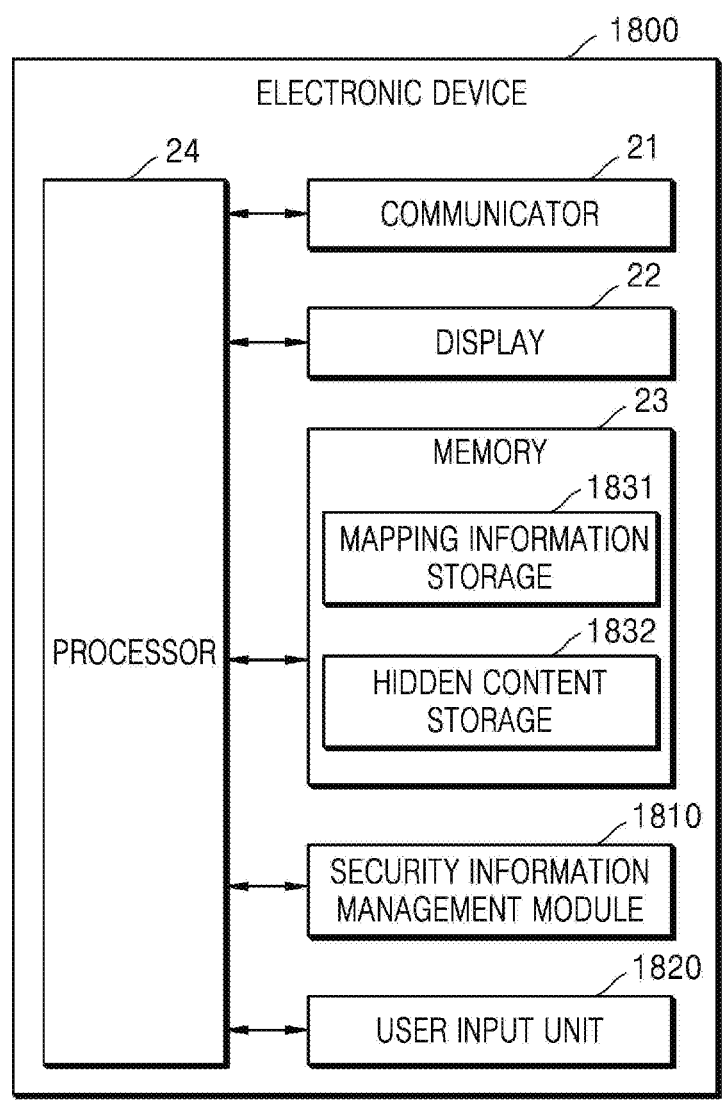
FIG. 18 is a block diagram for describing an inner configuration of an electronic device, according to an embodiment of the disclosure.

FIG. 18 is a block diagram for describing an inner configuration of an electronic device 1800, according to an embodiment of the disclosure.

Referring to FIG. 18, the electronic device 1800 may include the communicator 21, the display 22, the memory 23, the processor 24, a security information management module 1810, and a user input unit 1820. The electronic device 1800 of FIG. 18 corresponds to an example of an inner configuration of the electronic device 20 shown in FIG. 15. The communicator 21, the display 22, the memory 23, and the processor 24 are described above with reference to FIG. 15, and thus detailed descriptions thereof are not provided here.

The security information management module 1810 may generate or manage user authorization information, mapping information in which at least one key in a first key layout of the input device 30 is mapped to a different key, second key layout information in which the first key layout is converted according to the mapping information, information about second content converted from first content according to the mapping information, or the like. The security information management module 1810 will be described in detail with reference to FIG. 19.

The user input unit 1820 may receive a user input to control the electronic device 1800. The user input unit 1820 may provide an input user interface to the user. The input user interface may be implemented in various manners. For example, the input user interface may be implemented as a physical button, a touchable component on the display 22, a voice recognition interface, or the like. Also, the user input unit 1820 may obtain a user input from the input device 30, and the input device 30 may be included, as a hardware configuration or a software module, in the user input unit 1820 of the electronic device 1800.

According to an embodiment of the disclosure, the memory 23 may include mapping information storage 1831 and hidden content storage 1832. The mapping information storage 1831 may store mapping information received from the wearable device 10 or generated by the electronic device 1800. When the user wearing the wearable device 10 accesses content generated or edited by using mapping information, the mapping information stored in the mapping information storage 1831 may be used. Also, the mapping information storage 1831 may store mapping information as metadata with respect to content. The hidden content storage 1832 may store hidden content that is not displayed on the display 22 of the electronic device 1800, the content being from among content stored in the electronic device 1800 or content executed or processed in the electronic device 1800. The hidden content storage 1832 may be accessible only via the wearable device 10. That is, the hidden content storage 1832 may deliver the hidden content to the outside only when the wearable device 10 is connected for communication with the electronic device 1800 and the user of the wearable device 10 is authorized.

Figure 19:
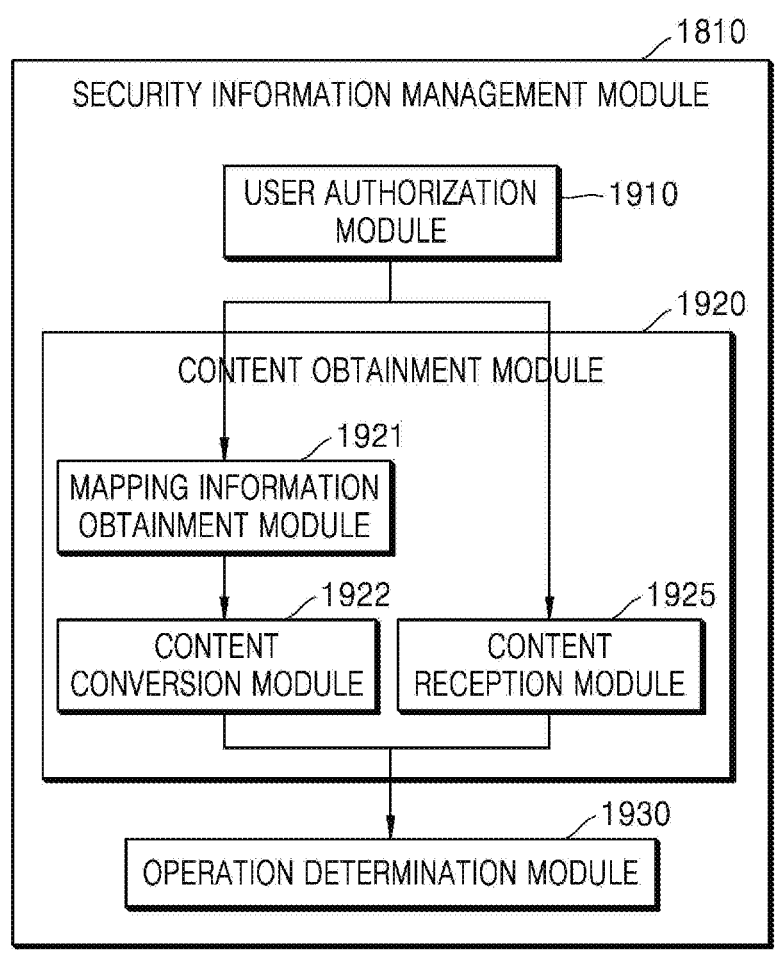
FIG. 19 is a block diagram for describing a security information management module of the electronic device, according to an embodiment of the disclosure.

FIG. 19 is a block diagram for describing a security information management module 1810 of the electronic device 1800, according to an embodiment of the disclosure.

Referring to FIG. 19, the security information management module 1810 may include a user authorization module 1910, a content obtainment module 1920, and an operation determination module 1930. The security information management module 1810 may be a group of a plurality of instructions stored in the memory 23 and executed by the processor 24. Alternatively, the security information management module 1810 may be a hardware configuration to perform a function of managing security information in the processor 24. Alternatively, the security information management module 1810 may be a special-purpose processor or a software module existing in the electronic device 1800, separately from the memory 23 or the processor 24.

The user authorization module 1910 may authorize whether a user of the wearable device 10 is a user who is authorized to access security information. For example, the user authorization module 1910 may authorize the user by comparing identification information of the user which is stored in the memory 23 of the electronic device 1800 with information of the user wearing the wearable device 10. Also, the user authorization module 1910 may newly obtain identification information of the user and may store the identification information in the memory 23.

The content obtainment module 1920 may include a mapping information obtainment module 1921, a content conversion module 1922, and a content reception module 1925. The mapping information obtainment module 1921 may obtain, from the wearable device 10, mapping information in which at least one key in the first key layout of the input device 30 is mapped to a different key. The content conversion module 1922 may convert first content input by the user via the input device 30 to second content by using the mapping information obtained by the mapping information obtainment module 1921. The content reception module 1925 may receive, from the wearable device 10, the second content converted according to the mapping information. That is, the content obtainment module 1920 may obtain the second content via at least one of the mapping information obtainment module 1921, the content conversion module 1922, or the content reception module 1925. The content obtainment module 1920 may include only the mapping information obtainment module 1921 and the content conversion module 1922 or may include only the content reception module 1925.

The operation determination module 1930 may determine an operation associated with the second content. The operation associated with the second content may include various operations performed by using the second content. For example, the operation associated with the second content may include at least one of an operation of storing the second content, an operation of transmitting the second content to an external device, an operation of authorizing a secure session by using the second content, or an operation of performing a preset process corresponding to the second content. The operation determination module 1930 may determine which one of the operations associated with the second content is to be performed, based on a type of an application executed in the electronic device 1800 or a type of the second content.

Figure 20:
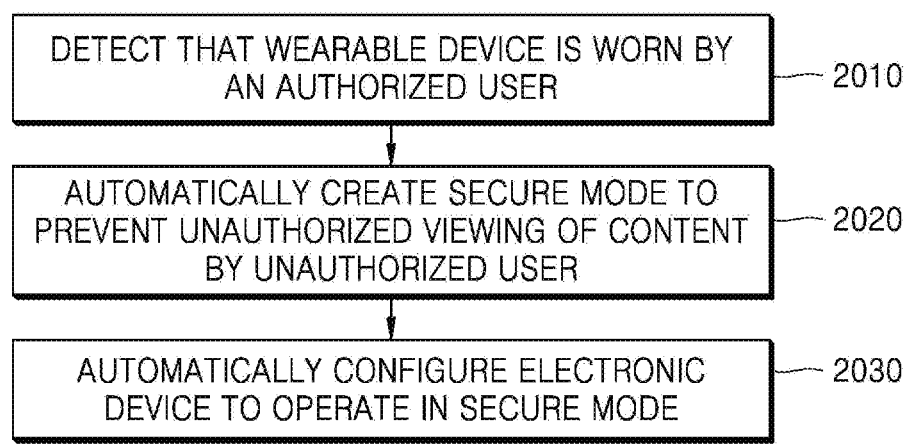
FIG. 20 is a flowchart for describing a method of configuring an electronic device to a secure mode, according to an embodiment of the disclosure.

Hereinafter, with reference to FIGS. 20 to 24, a method of displaying content according to an embodiment of the disclosure related to a method of setting the electronic device 20 to a secure mode will now be described FIG. 20 is a flowchart for describing a method of configuring the electronic device 20 to a secure mode, according to an embodiment of the disclosure.

Referring to FIG. 20, in operation 2010, the electronic device 20 according to an embodiment of the disclosure may detect that the wearable device 10 is worn by an authorized user. In operation 2020, the electronic device 20 according to an embodiment of the disclosure may automatically create a 'secure mode' to prevent unauthorized viewing of content by an unauthorized user. The secure mode indicates an operation mode in which content in a correct format is displayed to the authorized user whereas the content in an incorrect format is displayed to the unauthorized user. In operation 2030, the electronic device 20 according to an embodiment of the disclosure may automatically configure the electronic device 20 to operate in the secure mode. Also, an embodiment of FIG. 19 is described with the method of configuring the electronic device 20 to a secure mode, but descriptions provided with FIG. 19 may also be applied to a method of configuring the wearable device 10 to a secure mode.

Figure 21:
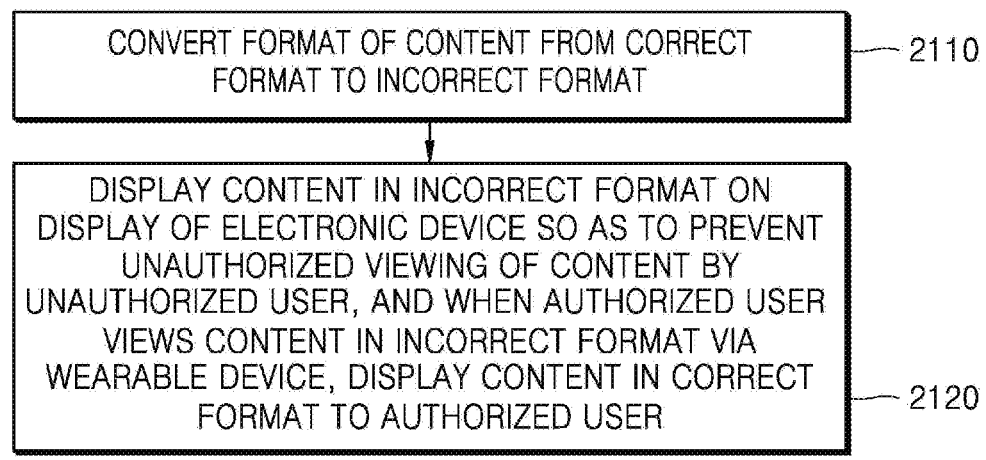
FIG. 21 is a flowchart for describing a method by which the wearable device and the electronic device display content in a secure mode, according to an embodiment of the disclosure.

FIG. 21 is a flowchart for describing a method by which the wearable device 10 and the electronic device 20 display content in a secure mode, according to an embodiment of the disclosure.

Referring to FIG. 21, in operation 2110, the wearable device 10 or the electronic device 20 according to an embodiment of the disclosure may convert a format of content from a correct format to an incorrect format. In operation 2120, the electronic device 20 operating in the secure mode displays the content in the incorrect format on a display of the electronic device 20, thereby preventing unauthorized viewing of content by an unauthorized user. Also, when a user views content in an incorrect format via the wearable device 10, the wearable device 10 operating in the secure mode may display the content in a correct format only when the user is an authorized user.

Figure 22:
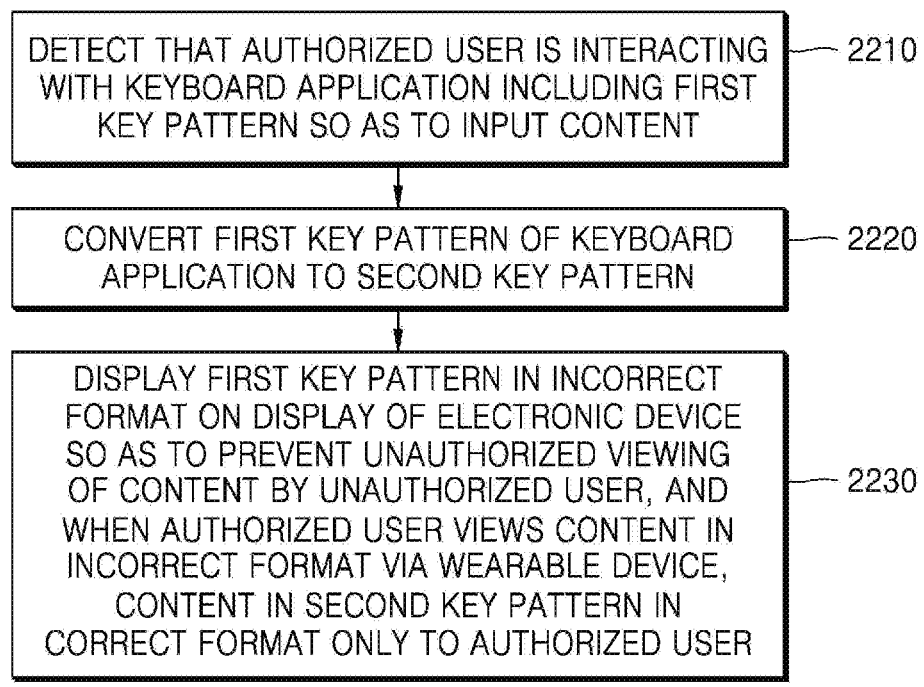
FIG. 22 is a flowchart for describing a method by which the wearable device and the electronic device display a key pattern in a secure mode, according to an embodiment of the disclosure.

FIG. 22 is a flowchart for describing a method by which the wearable device 10 and the electronic device 20 display a key pattern in a secure mode, according to an embodiment of the disclosure.

Referring to FIG. 22, in operation 2210, the wearable device 10 or the electronic device 20 according to an embodiment of the disclosure may detect that an authorized user is interacting with a keyboard application including a first key pattern so as to input content. In operation 2220, the wearable device 10 or the electronic device 20 according to an embodiment of the disclosure may convert the first key pattern of the keyboard application to a second key pattern. The second key pattern includes an arrangement of character keys different from those of the first key pattern. The first key pattern corresponds to an incorrect format, and the second key pattern corresponds to a correct format. In operation 2230, the electronic device 20 according to an embodiment of the disclosure may display, on a display of the electronic device 20, the first key pattern in an incorrect format so as to prevent unauthorized viewing of content by an unauthorized user. Also, when the authorized user views content in an incorrect format via the wearable device 10, the wearable device 10 according to an embodiment of the disclosure may display the content in a correct format only to the authorized user.

Figure 23:
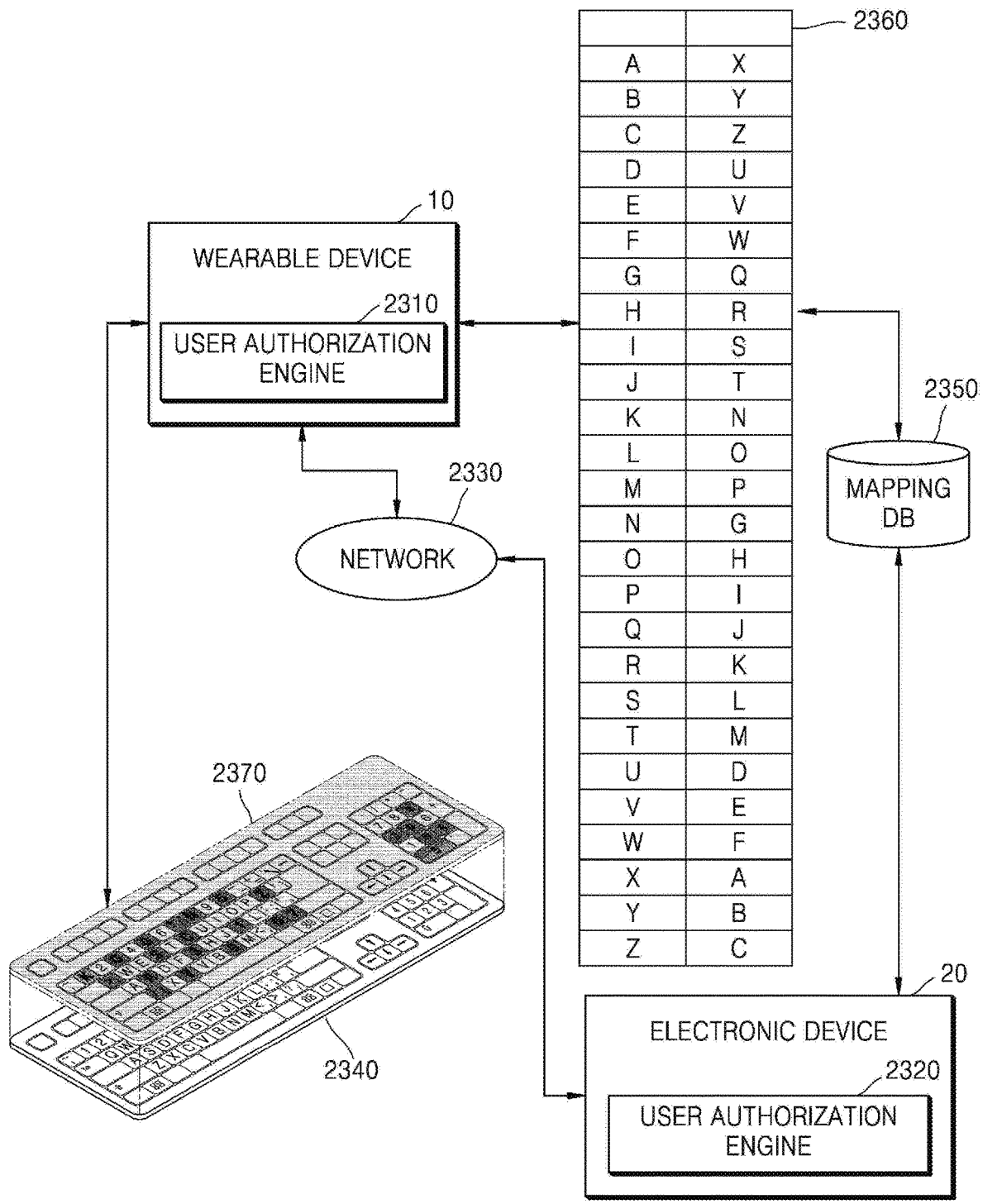
FIG. 23 is a diagram for describing a method by which the wearable device and the electronic device use mapping information, according to an embodiment of the disclosure.

FIG. 23 is a diagram for describing a method by which the wearable device 10 and the electronic device 20 use mapping information, according to an embodiment of the disclosure.

Referring to FIG. 23, a user of the electronic device 20 according to an embodiment of the disclosure is connected with the wearable device 10 via a secure communication mode. The wearable device 10 and the electronic device 20 may include user authorization engines 2310 and 2320, respectively. Each of the user authorization engines 2310 and 2320 may correspond to the user authorization engine 2400 of FIG. 24. The electronic device 20 and the wearable device 10 are connected for communication with each other by using a direction communication network 2330.

The wearable device 10 checks whether the user of the electronic device 20 is interested in writing something on a screen. The wearable device 10 identifies mapping information 2360 about a physical keyboard 2340 from a mapping database (DB) 2350 storing soft keyboard layouts. The wearable device 10 may identify a soft keyboard layout 2370, based on the identified mapping information 2360. The wearable device 10 displays the identified soft keyboard layout 2370 over the physical keyboard 2340 that actually exists.

When the user inputs a character or edits content by using the electronic device 20, a character associated with the physical keyboard 2340 is displayed on a physical (actual) display. However, the wearable device 10 has the mapping information 2360 of characters between a layout of the physical keyboard 2340 and a layout of the soft keyboard layout 2370, and thus, the character or the content input by the user may be correctly displayed on the wearable device 10. When the content edited by the user is stored in the electronic device 20, the mapping information 2360 is also stored as an encryption seed associated with a file. The stored encryption seed may be used to decrypt the stored content when the wearable device 10 is worn by the authorized user.

According to an embodiment of the disclosure, the physical keyboard 2340 is connected to the electronic device 20. The soft keyboard layout 2370 is connected to the wearable device 10 worn by the user. The electronic device 20 and the wearable device 10 are connected with each other in a wireless manner. The physical keyboard 2340 and the soft keyboard layout 2370 are connected to respective devices. For example, each of the wearable device 10 and the electronic device 20 may be connected with both the physical keyboard 2340 and the soft keyboard layout 2370. The electronic device 20 inputs only a character associated with a key used by the user. However, when the electronic device 20 detects that the input character is different from a character intended to be input by the user, the electronic device 20 may map the input character to a character of the soft keyboard layout 2370. As described above, the electronic device 20 and the wearable device 10 use the soft keyboard layout 2370, thereby preventing shoulder surfing. Also, content generated based on the mapping information 2360 or the soft keyboard layout 2370 may be protected against an attack by a hacker.

Figure 24:
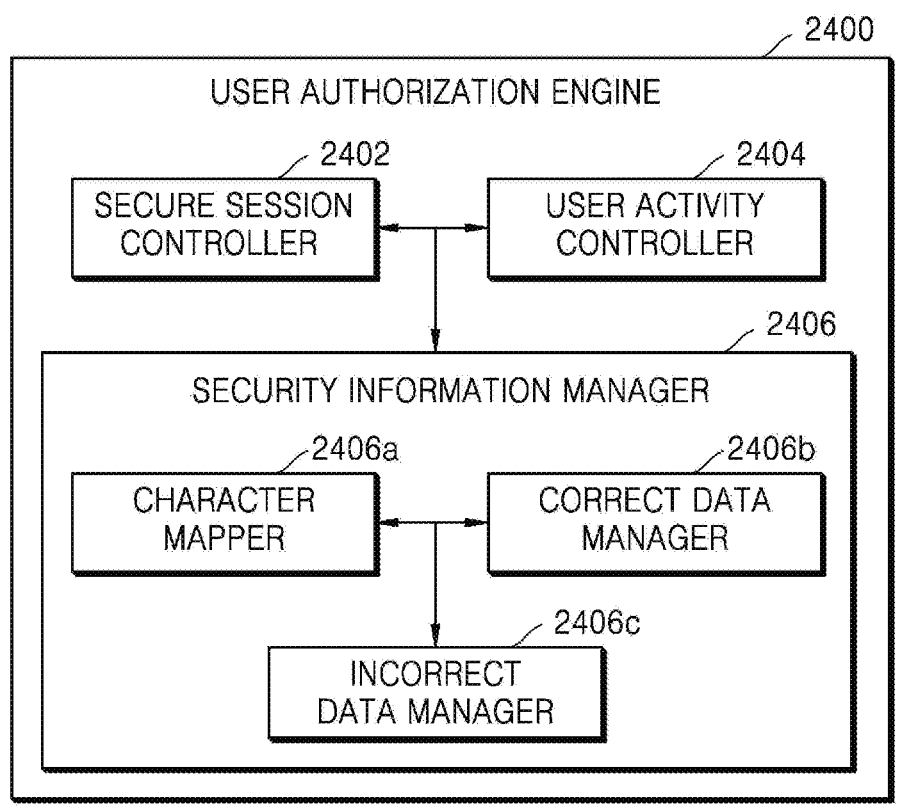
FIG. 24 is a block diagram of a user authorization engine, according to an embodiment of the disclosure.

FIG. 24 is a block diagram of a user authorization engine 2400, according to an embodiment of the disclosure.

Referring to FIG. 24, the user authorization engine 2400 according to an embodiment of the disclosure includes a secure session controller 2402, a user activity controller 2404, and a security information manager 2406. The security information manager 2406 includes a character mapper 2406a, a correct data manager 2406b, and an incorrect data manager 2406c. The user authorization engine 2400 of FIG. 24 may be included in each of the wearable device 10 and the electronic device 20. Therefore, with reference to FIG. 24, the user authorization engine 2400 will now be collectively described without distinguishing between the wearable device 10 and the electronic device 20.

According to an embodiment of the disclosure, the secure session controller 2402 may detect that the wearable device 10 is worn by an authorized user. According to a result of the detection, the secure session controller 2402 may authorize a secure session between the electronic device 20 and the wearable device 10, based on at least one item of biometric data of a user. The biometric data may include at least one of iris data, fingerprint data, voice pattern information (or, voice fingerprint data), or facial data of the user, but is not limited thereto and thus may include various types of biometric data. The secure session controller 2402 may automatically set the secure session between the electronic device 20 and the wearable device 10, based on at least one item of biometric data.

Also, the secure session controller 2402 may automatically create a secure mode to prevent unauthorized viewing of content by an unauthorized user. The secure mode indicates a mode in which content in a correct format is displayed to an authorized user, and content in an incorrect format is displayed to an unauthorized user.

According to the creation of the secure mode, the security information manager 2406 may convert a format of content from a correct format to an incorrect format by using the character mapper 2406a, the correct data manager 2406b, and the incorrect data manager 2406c. Also, the secure session controller 2402 controls the electronic device 20 to display the content in the incorrect format by using the character mapper 2406a, the correct data manager 2406b, and the incorrect data manager 2406c, thereby preventing unauthorized viewing of the content by the unauthorized user. Also, when the authorized user views the content in the incorrect format via the wearable device 10, the secure session controller 2402 may control the wearable device 10 to display the content in the correct format to the authorized user.

According to an embodiment of the disclosure, the user activity controller 2404 may detect that the authorized user inputs content by interacting with a keyboard application including a first key pattern. Also, the user activity controller 2404 may convert the first key pattern of the keyboard application to a second key pattern by using the character mapper 2406a, the correct data manager 2406b, and the incorrect data manager 2406c. The first key pattern corresponds to an incorrect format, and the second key pattern corresponds to a correct format. Also, the user activity controller 2404 may control the electronic device 20 to display, by using the character mapper 2406a, the correct data manager 2406b, and the incorrect data manager 2406c, the first key pattern in the incorrect format so as to prevent unauthorized viewing by the unauthorized user. Also, when the authorized user views content in the incorrect format via the wearable device 10, the user activity controller 2404 may control the wearable device 10 to display the content in the correct format only to the authorized user.

Also, the user activity controller 2404 may detect a key selected by the authorized user by using the wearable device 10 while the authorized user views the second key pattern in the correct format. Also, the user activity controller 2404 may recognize a correct character corresponding to the selected key. Also, the user activity controller 2404 may convert the correct character to an incorrect character by mapping, by using the character mapper 2406a, the correct data manager 2406b, and the incorrect data manager 2406c, the correct character corresponding to the selected key to the incorrect character in the first key pattern according to the incorrect format displayed on the electronic device 20. Also, the user activity controller 2404 controls the electronic device 20 to display the incorrect character, thereby preventing unauthorized viewing by the unauthorized user, and controlling the wearable device 10 to display the correct character only to the authorized user.

FIG. 24 illustrates various components of the user authorization engine 2400, but the illustrated components are only exemplary, and thus the user authorization engine 2400 may include more or less components than the components illustrated in FIG. 24. Also, labels or names of the components are used only as an example and do not limit the scope of the disclosure. Also, to prevent unauthorized viewing of content, one or more components in the user authorization engine 2400 may be combined to perform substantially same or similar functions.

The methods according to embodiments of the disclosure as described in the specification or in the following claims may be implemented as hardware, software, or a combination of hardware and software.

When implemented as software, a computer-readable storage medium or computer program product which stores one or more programs (e.g., software modules) may be provided. The one or more programs stored in the computer-readable storage medium or the computer program product are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory including RAM or flash memory, ROM, EEPROM, a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access, via an external port, a device performing the embodiments of the disclosure. Furthermore, a separate storage device on the communication network may access the electronic device performing the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a wearable device, of displaying content, the method comprising:
   authorizing a user wearing the wearable device;
   identifying a first key layout of an input device connected to an electronic device used by the authorized user;
   generating mapping information in which at least one key in the first key layout is mapped to a different key;
   displaying, on a display of the wearable device, a second key layout in which the first key layout is mapped according to the mapping information;

identifying second content as content input by the authorized user, based on the second key layout and an input of the authorized user with respect to the input device; and displaying the second content on the display of the wearable device while the electronic device displays first content determined based on the first key layout and the input of the authorized user with respect to the input device, wherein the second content and the first content are mutually mapped to each other according to the mapping information.

2. The method of claim 1, wherein the identifying of the second content as the content input by the authorized user comprises:

obtaining information about a key selected from the input device by the authorized user;

determining a key mapped to the selected key, according to the mapping information; and determining the mapped key as the content input by the authorized user.

3. The method of claim 1, further comprising:

transmitting the mapping information or the second content to the electronic device, wherein the mapping information is used when the first content is converted to the second content in the electronic device, and wherein the second content is used, as the content input the authorized user, in the electronic device.

4. The method of claim 1, further comprising:

generating additional mapping information in which at least one key in the first key layout is mapped to a different key; and transmitting the additional mapping information to the electronic device, wherein the additional mapping information is used when the first content is converted to a third content before the third content is displayed on a display of the electronic device.

5. The method of claim 1, further comprising:

receiving information about hidden content from the electronic device; and displaying the hidden content on the display of the wearable device, based on determining that the user wearing the wearable device is the authorized user, wherein the hidden content indicates content that is not displayed on the display of the electronic device, the content being from among content stored in the electronic device or content executed in the electronic device.

6. The method of claim 5, wherein the receiving of the information about the hidden content from the electronic device comprises:

receiving, from the electronic device, a confirmation request requesting whether the user wearing the wearable device has authority to access the hidden content;

transmitting a response message comprising at least one of positive response information or user authorization information about the authorized user to the electronic device, based on determining that the user wearing the wearable device is the authorized user; and receiving information about the hidden content from the electronic device, in response to the response message.

7. A wearable device for displaying content, the wearable device comprising:

a transceiver;
a display;

a memory storing a plurality of instructions; and
at least one processor configured to:

execute the plurality of instructions to authorize a user wearing the wearable device, identify a first key layout of an input device connected to an electronic device used by the authorized user, generate mapping information in which at least one key in the first key layout is mapped to a different key, control the display to display a second key layout in which the first key layout is mapped according to the mapping information, identify second content as content input by the authorized user, based on the second key layout and an input of the authorized user with respect to the input device, and control the display to display the second content while the electronic device displays first content determined based on the first key layout and the input of the authorized user with respect to the input device, wherein the second content and the first content are mutually mapped to each other according to the mapping information.

8. The wearable device of claim 7, wherein the at least one processor is further configured to execute the plurality of instructions to:

obtain information about a key selected from the input device by the authorized user;

determine a key mapped to the selected key, according to the mapping information; and determine the mapped key as the content input by the authorized user.

9. The wearable device of claim 7, wherein the at least one processor is further configured to execute the plurality of instructions to control the transceiver to transmit the mapping information or the second content to the electronic device, wherein the mapping information is used when the first content is converted to the second content in the electronic device, and wherein the second content is used, as the content input the authorized user, in the electronic device.

10. The wearable device of claim 7, wherein the at least one processor is further configured to execute the plurality of instructions to:

generate additional mapping information in which at least one key in the first key layout is mapped to a different key, and control the transceiver to transmit the additional mapping information to the electronic device, and wherein the additional mapping information is used when the first content is converted to a third content before the third content is displayed on a display of the electronic device.

11. The wearable device of claim 7, wherein the at least one processor is further configured to execute the plurality of instructions to:

control the transceiver to receive information about hidden content from the electronic device, and control the display to display the hidden content, based on determining that the user wearing the wearable device is the authorized user, and wherein the hidden content indicates content that is not displayed on the display of the electronic device, the content being from among content stored in the electronic device or content executed in the electronic device.

12. The wearable device of claim 11, wherein the at least one processor is further configured to execute the plurality of instructions to control the transceiver to:
- receive, from the electronic device, a confirmation request requesting whether the user wearing the wearable device has authority to access the hidden content,
- transmit a response message comprising at least one of positive response information or user authorization information about the authorized user to the electronic device, based on determining that the user wearing the wearable device is the authorized user, and
- receive information about the hidden content from the electronic device, in response to the response message.

13. A non-transitory computer-readable recording medium having recorded thereon at least one program comprising commands, which when executed by a computer, performs the method of the claim 1.

* * * * *